US010645404B2

(12) United States Patent
Wang et al.

(10) Patent No.: US 10,645,404 B2
(45) Date of Patent: May 5, 2020

(54) GENERIC USE OF HEVC SEI MESSAGES FOR MULTI-LAYER CODECS

(71) Applicant: QUALCOMM Incorporated, San Diego, CA (US)

(72) Inventors: Ye-Kui Wang, San Diego, CA (US); Adarsh Krishnan Ramasubramonian, San Diego, CA (US); Fnu Hendry, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 331 days.

(21) Appl. No.: 14/665,999

(22) Filed: Mar. 23, 2015

(65) Prior Publication Data
US 2015/0271529 A1  Sep. 24, 2015

Related U.S. Application Data

(60) Provisional application No. 61/969,797, filed on Mar. 24, 2014.

(51) Int. Cl.
*H04N 19/60*  (2014.01)
*H04N 19/70*  (2014.01)
(Continued)

(52) U.S. Cl.
CPC ............. *H04N 19/37* (2014.11); *H04N 19/60* (2014.11); *H04N 19/70* (2014.11); *H04N 19/88* (2014.11); *H04N 19/89* (2014.11); *H04N 19/30* (2014.11)

(58) Field of Classification Search
CPC ........ H04N 19/30; H04N 19/37; H04N 19/60; H04N 19/70; H04N 19/88; H04N 19/89
(Continued)

(56) References Cited

U.S. PATENT DOCUMENTS 8,644,344 B2   2/2014  Wiegand
8,918,533 B2  12/2014  Chen et al.
(Continued)

FOREIGN PATENT DOCUMENTS

CN    101213841 A    7/2008
JP    2012222710 A   11/2012
(Continued)

OTHER PUBLICATIONS

Amon P., et al., "File Format for Scalable Video Coding", IEEE Transactions on Circuits and Systems for Video Technology, IEEE Service Center, PISCATAWAY, NJ, US, vol. 17, No. 9, Sep. 1, 2007 (Sep. 1, 2007), pp. 1174-1185, XP011193013, ISSN: 1051-8215, DOI:10.1109/TCSVT.2007.905521.
(Continued)

*Primary Examiner* — Jamie J Atala
*Assistant Examiner* — Patrick E Demosky
(74) *Attorney, Agent, or Firm* — Shumaker & Sieffert, P.A.

(57) ABSTRACT

In an example, a method of coding video data includes obtaining one or more video coding layer (VCL) network abstraction layer (NAL) units of an access unit and a first layer of a multi-layer bitstream of video data. The method also includes only coding one or more non-VCL NAL units containing an SEI message applicable to the VCL NAL units of the first layer together with the VCL NAL units of the first layer such that within the access unit the bitstream does not contain any coded pictures of any other layer of the multi-layer bitstream between the VCL NAL units of the first layer and the non-VCL NAL units containing the SEI message applicable to the VCL NAL units of the first layer.

23 Claims, 7 Drawing Sheets

(51) Int. Cl.
*H04N 19/88* (2014.01)
*H04N 19/89* (2014.01)
*H04N 19/37* (2014.01)
*H04N 19/30* (2014.01)

(58) Field of Classification Search
USPC .................................................. 375/240.26
See application file for complete search history.

(56) References Cited

U.S. PATENT DOCUMENTS

| | | | | |
|---|---|---|---|---|
| 9,247,249 | B2* | 1/2016 | Chen | H04N 19/597 |
| 9,674,524 | B2* | 6/2017 | Deshpande | H04N 19/423 |
| 2005/0190774 | A1* | 9/2005 | Wiegand | H04L 29/06027 |
| | | | | 370/395.64 |
| 2007/0116426 | A1* | 5/2007 | Toma | G11B 27/005 |
| | | | | 386/248 |
| 2007/0189732 | A1 | 8/2007 | Pothana et al. | |
| 2008/0013620 | A1 | 1/2008 | Hannuksela et al. | |
| 2008/0291999 | A1 | 11/2008 | Lerouge et al. | |
| 2009/0003439 | A1 | 1/2009 | Wang et al. | |
| 2009/0116562 | A1 | 5/2009 | Eleftheriadis | |
| 2010/0142613 | A1* | 6/2010 | Zhu | H04N 21/2383 |
| | | | | 375/240.02 |
| 2011/0072439 | A1* | 3/2011 | Noda | G06T 1/20 |
| | | | | 718/104 |
| 2011/0129114 | A1 | 6/2011 | Colaitis et al. | |
| 2013/0034170 | A1* | 2/2013 | Chen | H04N 13/00 |
| | | | | 375/240.25 |
| 2013/0114735 | A1 | 5/2013 | Wang et al. | |
| 2013/0272429 | A1 | 10/2013 | Srinivasan et al. | |
| 2013/0272618 | A1 | 10/2013 | Deshpande et al. | |
| 2013/0278642 | A1 | 10/2013 | Dong et al. | |
| 2013/0278834 | A1* | 10/2013 | Ma | G09G 3/001 |
| | | | | 348/730 |
| 2014/0003489 | A1* | 1/2014 | Hannuksela | H04N 19/70 |
| | | | | 375/240.02 |
| 2014/0092992 | A1 | 4/2014 | Sullivan et al. | |
| 2014/0092994 | A1* | 4/2014 | Wang | H04N 19/70 |
| | | | | 375/240.26 |
| 2014/0093180 | A1* | 4/2014 | Esenlik | H04N 19/70 |
| | | | | 382/233 |
| 2014/0133567 | A1* | 5/2014 | Rusanovskyy | H04N 19/597 |
| | | | | 375/240.16 |
| 2014/0177706 | A1 | 6/2014 | Fernandes et al. | |
| 2014/0198857 | A1* | 7/2014 | Deshpande | H04N 19/513 |
| | | | | 375/240.25 |
| 2014/0301451 | A1* | 10/2014 | Deshpande | H04N 19/597 |
| | | | | 375/240.12 |
| 2014/0301476 | A1* | 10/2014 | Deshpande | H04N 19/70 |
| | | | | 375/240.25 |
| 2014/0376618 | A1* | 12/2014 | Ma | H04N 19/127 |
| | | | | 375/240.03 |
| 2015/0016547 | A1* | 1/2015 | Tabatabai | H04N 19/423 |
| | | | | 375/240.26 |
| 2015/0027128 | A1 | 1/2015 | Benkler et al. | |
| 2015/0071356 | A1 | 3/2015 | Kim et al. | |
| 2015/0085938 | A1* | 3/2015 | Hendry | H04N 19/70 |
| | | | | 375/240.25 |
| 2015/0103886 | A1* | 4/2015 | He | H04N 19/188 |
| | | | | 375/240.02 |
| 2015/0103921 | A1 | 4/2015 | Hannuksela | |
| 2015/0124864 | A1* | 5/2015 | Kim | H04N 19/70 |
| | | | | 375/240.02 |
| 2015/0172679 | A1* | 6/2015 | Choi | H04N 19/597 |
| | | | | 375/240.24 |
| 2015/0245075 | A1* | 8/2015 | Lee | H04N 19/46 |
| | | | | 375/240.16 |
| 2015/0271498 | A1 | 9/2015 | Wang et al. | |
| 2015/0271507 | A1* | 9/2015 | Hendry | H04N 19/70 |
| | | | | 375/240.25 |
| 2015/0271528 | A1 | 9/2015 | Wang et al. | |
| 2015/0288970 | A1* | 10/2015 | Park | H04N 19/105 |
| | | | | 375/240.13 |
| 2016/0295220 | A1 | 10/2016 | Oh et al. | |
| 2016/0381394 | A1 | 12/2016 | Sychev et al. | |
| 2017/0006300 | A1 | 1/2017 | Tsukuba et al. | |

FOREIGN PATENT DOCUMENTS

| | | |
|---|---|---|
| WO | 2007006855 A1 | 1/2007 |
| WO | 2012009454 A1 | 1/2012 |
| WO | 2012145670 | 10/2012 |
| WO | 2015137237 A1 | 9/2015 |

OTHER PUBLICATIONS

International Preliminary Report on Patentability from PCT Application Serial No. PCT/US2015/022303 dated Aug. 29, 2016 (10 pages).

Invitation to Pay Additional Fees and, Where Applicable, Protest Fee from corresponding PCT Application Serial No. PCT/US2015/022297 dated Jun. 16, 2015 (7 pages).

Wiegand et al., "WD1: Working Draft 1 of High-Efficiency Video Coding", JCTVC-C403, 3rd Meeting: Guangzhou, CN, Oct. 7-15, 2010, (Joint Collaborative Team on Video Coding of ISO/IEC JTC1/SC29/WG11 and ITU-T SG.16); Jan. 6, 2011, 137 pp.

Wiegand et al., "WD2: Working Draft 2 of High-Efficiency Video Coding," JCTVC-D503, 4th Meeting: Daegu, KR, Jan. 20-28, 2011, (Joint Collaborative Team on Video Coding of ISO/IEC JTC1/SC29/WG11 and ITU-T SG.16); Apr. 15, 2011, 153 pp.

Wiegand et al., "WD3: Working Draft 3 of High-Efficiency Video Coding," Document JCTVC-E603, 5th Meeting: Geneva, CH, Mar. 16-23, 2011,(Joint Collaborative Team on Video Coding of ISO/IEC JTC1/SC29/WG11 and ITU-T SG.16); May 9, 2015, 193 pp.

Bross et al., "WD4: Working Draft 4 of High-Efficiency Video Coding," 6th Meeting: Torino, IT, Jul. 14-22, 2011, (Joint Collaborative Team on Video Coding of ISO/IEC JTC1/SC29/WG11 and ITU-T SG.16);JCTVC-F803_d2, Oct. 4, 2011, 226 pp.

Bross et al., "WD5: Working Draft 5 of High-Efficiency Video Coding," 7th Meeting: Geneva, Switzerland, Nov. 21-30, 2011, (Joint Collaborative Team on Video Coding of ISO/IEC JTC1/SC29/WG11 and ITU-T SG.16);JCTVC-G1103_d2, Dec. 30, 2011, 214 pp.

Bross et al., "High efficiency video coding (HEVC) text specification draft 6," 8th Meeting: San Jose, CA, USA, Feb. 1-10, 2012, (Joint Collaborative Team on Video Coding of ISO/IEC JTC1/SC29/WG11 and ITU-T SG.16); JCTVC-H1003, Apr. 2, 2012, 259 pages.

Bross et al., "High efficiency video coding (HEVC) text specification draft 7," 9th Meeting: Geneva, CH, Apr. 27 through May 7, 2012, (Joint Collaborative Team on Video Coding of ISO/IEC JTC1/SC29/WG11 and ITU-T SG.16); JCTVC-I1003_d2, Jun. 1, 2012, 290 pp.

Bross et al., "High efficiency video coding (HEVC) text specification draft 8," 10th Meeting: Stockholm, SE, Jul. 11-20, 2012, (Joint Collaborative Team on Video Coding of ISO/IEC JTC1/SC29/WG11 and ITU-T SG.16); JCTVC-J1003_d7, Jul. 28, 2012, 261 pp.

Bross et al., "High efficiency video coding (HEVC) text specification draft 9," 11th Meeting: Shanghai, CN, Oct. 10-19, 2012, (Joint Collaborative Team on Video Coding of ISO/IEC JTC1/SC29/WG11 and ITU-T SG.16); JCTVC-K1003_v7, Nov. 2, 2012, 290 pp.

Bross et al., "High efficiency video coding (HEVC) text specification draft 10 (For FDIS & Last Call)," 12th Meeting: Geneva, CH, Jan. 14-23, 2013, (Joint Collaborative Team on Video Coding of ISO/IEC JTC1/SC29/WG11 and ITU-T SG.16); JCTVC-L1003_v34, Mar. 19, 2013, 310 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.

(56) References Cited

OTHER PUBLICATIONS

ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
Bross, et al., "Editors' Proposed Corrections to HEVC Version 1," Joint Collaborative Team on Video Coding (JCT-VC) of ITU-T SG16 WP3 and ISO/IEC JTC1/SC29/WG11, 13th Meeting, Incheon, KR, Apr. 2013, which as of Sep. 30, 2013, XP030057924, 310 pp.
Chen, et al., "High Efficiency Video Coding (HEVC) Scalable Extensions Draft 5", JCT-VC Meeting; Jan. 9-17, 2014; San Jose; (Joint Collaborative Team on Video Coding of ISO/IEC JTC1/SC29/WG11 and ITU-T SG_16); URL: HTTP://WFTP3.ITU.INT/AV-ARCH/JCTVC-SITE/, No. JCTVC-P1008-v4, Jan. 22, 2014, XP030115882, 125 pp.
Flynn, "Simplifying Decoder Mismatch Checking", BBC R&D, Mar. 20, 2011, Mar. 16-23, 2011; No. JCTVC-E490, Mar. 20, 2011; XP030008996, 2 pp.
Schierl, et al., "System Layer Integration of High Efficiency Video Coding," IEEE Transactions on Circuits and Systems for Video Technology, vol. 22 (12), Dec. 12, 2012, pp. 1871-1884.
Sjoberg R., et al., "Overview of HEVC High-Level Syntax and Reference Picture Management," IEEE Transactions on Circuits and Systems for Video Technology, vol. 22 (12), XP011486337, Dec. 2012, pp. 1858-1870.
Tech, et al., "MV-HEVC Draft Text 7", JCT-3V Meeting; Jan. 11-17, 2014; San Jose; (The Joint Collaborative Team on 3D Video Coding Extension Development of ISO/IEC JTC1/SC29/WG11 and ITU-T SG.16); URL: HTTP://PHENIX.INT-EVRY.FR/JCT2/, No. JCT3V-G1004-v8, Mar. 17, 2014; XP030132042, 129 pp.
Wang, et al., "MV-HEVC/SHVC HLS: SEI message cleanups", JCT-3V Meeting; Mar. 27-Apr. 4, 2014; Valencia; (The Joint Collaborative Team on 3D Video Coding Extension Development of ISO/IEC JTC1/SC29/WG11 and ITU-T SG.16); URL: HTTP://PHENIX.INT-EVRY.FR/JCT2/, No. JCTVC-Q0183, No. JCT3V-H0082, Mar. 25, 2014, XP030132140, 6 pp.
Wang, "AHG9: High-level syntax clean-ups", JCT-VC Meeting; Mpeg Meeting; Oct. 10-19, 2012; Shanghai; (Joint Colloborative Team on Video Coding of ISO/IEC JTC1/SC29/WG11 and ITU-T SG.16); URL: HTTP://WFTP3.ITU.INT/AV-ARCH/JCTVC-SITE/, No. JCTVC-K0120, Oct. 1, 2012, XP030113002, 7 pp.
Sullivan, et al., "Overview of the High Efficiency Video Coding (HEVC) Standard," IEE Transactions on Circuits and Systems for Video Technology, vol. 22, No. 12, Dec. 2012, pp. 1649-1668.
"High-Level Syntax," Signals and Communication Technology, High Efficiency Video Coding, Chapter 5, Sep. 30, 2014, pp. 133-160.
"Extensions to HEVC" Signals and Communication Technology, High Efficiency Video Coding, Chapter 12, Sep. 30, 2014, pp. 291-308.
Tech, et al., "MV-HEVC Draft Text 7," JCT-3V Meeting; Jan. 11-17, 2014; San Jose; (The Joint Collaborative Team on 3D Video Coding Extension Development of ISO/IEC JTC1/SC29/WG11 and ITU-T SG.16); URL: HTTP://PHENIX.INT-EVRY.FR/JCT2/, No. JCT3V-G1004-v7, Feb. 28, 2014; 131 pp.
Wang, et al., "High Efficiency Video Coding (HEVC) Defect Report 3," Jan. 9-17, 2014; (The Joint Collaborative Team on 3D Video Coding Extension Development of ISO/IEC JTC1/SC29/WG11 and ITU-T SG.16); Jan. 8, 2014; No. JCTVC-P1003_v1, 313 pp.
Chen, et al., "High efficiency video coding (HEVC) scalable extensions Draft 5," (The Joint Collaborative Team on 3D Video Coding Extension Development of ISO/IEC JTC1/SC29/WG11 and ITU-T SG.16 ); Jan. 9-17, 2014; No. JCTVC-P1008_v4, Jan. 22, 2014; 125 pp.
International Search Report and Written Opinion from International Application No. PCT/US2015/022303, dated Feb. 2, 2016, 13 pp.
International Search Report and Written Opinion from International Application No. PCT/US2015/022286, dated Aug. 19, 2015, 16 pp.
Response to Written Opinion dated Aug. 19, 2015, from International Application No. PCT/US2015/022286, filed on Jan. 22, 2016, 4 pp.
International Search Report and Written Opinion from International Application No. PCT/US2015/022297, dated Aug. 14, 2015, 15 pp.
Response to Written Opinion dated Aug. 14, 2015, International Application No. PCT/US2015/022297, filed on Dec. 10, 2015, 16 pp.
Second Written Opinion from International Application No. PCT/US2015/022297, dated Feb. 1, 2016, 6 pp.
Response to Second Written Opinion dated Feb. 1, 2016, International Application No. PCT/US2015/022297, filed on Apr. 1, 2016, 16 pp.
Second Written Opinion from International Application No. PCT/US2015/022286, dated Apr. 21, 8 pp.
Response to Written Opinion dated Feb. 2, 2016, International Application No. PCT/US2015/022303, filed Apr. 29, 2016, 4 pp.
Response to Second Written Opinion dated Apr. 21, 2016 from International Application No. PCT/US2015/022286, filed on Jun. 21, 2016, 4 pp.
International Preliminary Report on Patentability from International Application No. PCT/US20151022286, dated Jun. 30, 2016, 10 pp.
International Preliminary Report on Patentability from International Application No. PCT/US20151022297, dated Jun. 3, 2016, 10 pp.
Second Written Opinion from International Application No. PCT/US2015/022303, dated Jun. 14, 2016, 5 pp.
Response to Second Written Opinion dated Jun. 14, 2016, from International Application No. PCT/US20158/022303, filed on Aug. 12, 2016, 21 pp.
Chen J., et al., Scalable HEVC (SHVC) Test Model 4 (SHM 4), Joint Collaborative Team on Video Coding (JCT-VC) 15th Meeting: Geneva, CN, JCTVC-O1007-v1.zip, Dec. 2, 2013, JCTVC-O1007_v1.docx, Sec. 2.1, 11 pages.
ITU-T, "Series H: Audiovisual and Multimedia Systems Infrastructure of audiovisual services—Coding of moving video—Advanced video coding for generic audiovisual services", Jan. 2012, 680 pp.
ITU-T, H.265 High efficiency video coding, Series H: Audiovisual and Multimedia Systems Infrastructure of audiovisual services—Coding of moving video, Apr. 30, 2013, Sec.D.2.23, D.2.25, 5 pp.
Ookubo S., H.265/HEVC Textbook, Impress Japan Corporation, Oct. 21, 2013, Ver. 1, pp. 92-95,195-196,266.
Flynn D., et al., "High Efficiency Video Coding (HEVC) Range Extensions text specification: Draft 6," (Joint 31 Collaborative Team on Video Coding of ITU-T SG.16 WP 3 and ISO/IEC JTC1/SC29/WG11), 16th Meeting: San Jose, US, Jan. 9-17, 2014, Document: JCTVC-P1005_v1, 368 pages.
Segall A., et al., "Report of Results of the Joint Call for Proposals on Scalable High Efficiency Video Coding (SHVC)," 11. JCT-VC Meeting, 102, MPEG Meeting, Oct. 10, 2012-Oct. 19, 2012, Shanghai, CN (Joint Collaborative Team on Video Coding of ISO/IEC JTC1/SC29/WG11 and ITU-T SG.16), URL: HTTP://WFTP3.1TU.INT/AV-ARCH/JCTVC-SITE/, No. JCTVC-K1008, Nov. 22, 2012 (Nov. 22, 2012), XP030113274, pp. 1-11.

* cited by examiner

GENERIC USE OF HEVC SEI MESSAGES FOR MULTI-LAYER CODECS

This application claims the benefit of U.S. Provisional Application 61/969,797, filed Mar. 24, 2014, the entire content of which is incorporated herein by reference.

TECHNICAL FIELD

This disclosure relates to video coding and compression, and signaling of data associated with compressed video in a bitstream.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

Aspects of this disclosure are directed to techniques for applying supplemental enhancement layer (SEI) messages that are defined in the High Efficiency Video Coding (HEVC) standard in a multi-layer context. For example, the techniques of this disclosure may include changes to and/or constraints for a variety of SEI message syntax set forth in HEVC to be applied in multi-layer video coding, e.g., using extensions to the HEVC standard such as a Multi-view Video Coding extension to HEVC (MV-HEVC) or a Scalable Video Coding (SVC) extension to HEVC (SHVC). In some instances, the techniques may improve computational efficiency and/or error resilience of such multi-layer codecs.

In an example, a method of coding video data includes obtaining one or more video coding layer (VCL) network abstraction layer (NAL) units of an access unit and a first layer of a multi-layer bitstream of video data, and only coding one or more non-VCL NAL units containing an SEI message applicable to the VCL NAL units of the first layer together with the VCL NAL units of the first layer such that within the access unit the bitstream does not contain any coded pictures of any other layer of the multi-layer bitstream between the VCL NAL units of the first layer and the non-VCL NAL units containing the SEI message applicable to the VCL NAL units of the first layer.

In another example, a device for coding video data includes a memory configured to store at least a portion of a multi-layer bitstream of video data, and one or more processors configured to obtain one or more video coding layer (VCL) network abstraction layer (NAL) units of an access unit and a first layer of the multi-layer bitstream of video data, and only code one or more non-VCL NAL units containing an SEI message applicable to the VCL NAL units of the first layer together with the VCL NAL units of the first layer such that within the access unit the bitstream does not contain any coded pictures of any other layer of the multi-layer bitstream between the VCL NAL units of the first layer and the non-VCL NAL units containing the SEI message applicable to the VCL NAL units of the first layer.

In another example, an apparatus for coding video data includes means for obtaining one or more video coding layer (VCL) network abstraction layer (NAL) units of an access unit and a first layer of a multi-layer bitstream of video data, and means for only coding one or more non-VCL NAL units containing an SEI message applicable to the VCL NAL units of the first layer together with the VCL NAL units of the first layer such that within the access unit the bitstream does not contain any coded pictures of any other layer of the multi-layer bitstream between the VCL NAL units of the first layer and the non-VCL NAL units containing the SEI message applicable to the VCL NAL units of the first layer.

In another example, a non-transitory computer-readable medium has instructions stored thereon that, when executed, cause one or more processors to obtain one or more video coding layer (VCL) network abstraction layer (NAL) units of an access unit and a first layer of a multi-layer bitstream of video data, and only code one or more non-VCL NAL units containing an SEI message applicable to the VCL NAL units of the first layer together with the VCL NAL units of the first layer such that within the access unit the bitstream does not contain any coded pictures of any other layer of the multi-layer bitstream between the VCL NAL units of the first layer and the non-VCL NAL units containing the SEI message applicable to the VCL NAL units of the first layer.

In another example, a method of coding video data includes coding one or more non-video coding layer (VCL) network abstraction layer (NAL) units of a layer of a multi-layer bitstream, wherein the one or more non-VCL NAL units contain a decoded picture hash SEI message, and determining a set of layers of the multi-layer bitstream to which the decoded picture hash SEI message is applicable based on a layer identifier of the one or more non-VCL NAL units containing the decoded picture hash SEI message.

In another example, a device for coding video data includes a memory configured to store at least a portion of a multi-layer bitstream, and one or more processors configured to code one or more non-video coding layer (VCL) network abstraction layer (NAL) units of a layer of a multi-layer bitstream, wherein the one or more non-VCL NAL units contain a decoded picture hash SEI message, and determine a set of layers of the multi-layer bitstream to which the decoded picture hash SEI message is applicable based on a layer identifier of the one or more non-VCL NAL units containing the decoded picture hash SEI message.

In another example, an apparatus for coding video data includes means for coding one or more non-video coding layer (VCL) network abstraction layer (NAL) units of a layer of a multi-layer bitstream, wherein the one or more non-VCL NAL units contain a decoded picture hash SEI message, and means for determining a set of layers of the multi-layer bitstream to which the decoded picture hash SEI message is applicable based on a layer identifier of the one or more non-VCL NAL units containing the decoded picture hash SEI message.

In another example, a non-transitory computer-readable medium has instructions stored thereon that, when executed, cause one or more processors to code one or more non-video coding layer (VCL) network abstraction layer (NAL) units of a layer of a multi-layer bitstream, wherein the one or more non-VCL NAL units contain a decoded picture hash SEI message, and determine a set of layers of the multi-layer bitstream to which the decoded picture hash SEI message is applicable based on a layer identifier of the one or more non-VCL NAL units containing the decoded picture hash SEI message.

In another example, a method of coding video data includes coding one or more non-video coding layer (VCL) network abstraction layer (NAL) units of a layer of a multi-layer bitstream of video data, wherein the one or more non-VCL NAL units contain an SEI message having an SEI payload type, and determining one or more syntax values of the multi-layer bitstream to which the SEI message applies based on the SEI payload type.

In another example, a device for coding video data includes a memory configured to store a layer of a multi-layer bitstream, and one or more processors configured to code one or more non-video coding layer (VCL) network abstraction layer (NAL) units of a layer of a multi-layer bitstream of video data, wherein the one or more non-VCL NAL units contain an SEI message having an SEI payload type, and determine one or more syntax values of the multi-layer bitstream to which the SEI message applies based on the SEI payload type.

In another example, an apparatus for coding video data includes means for coding one or more non-video coding layer (VCL) network abstraction layer (NAL) units of a layer of a multi-layer bitstream of video data, wherein the one or more non-VCL NAL units contain an SEI message having an SEI payload type, and means for determining one or more syntax values of the multi-layer bitstream to which the SEI message applies based on the SEI payload type.

In another example, a non-transitory computer-readable medium has instructions stored thereon that, when executed, cause one or more processors to code one or more non-video coding layer (VCL) network abstraction layer (NAL) units of a layer of a multi-layer bitstream of video data, wherein the one or more non-VCL NAL units contain an SEI message having an SEI payload type, and determine one or more syntax values of the multi-layer bitstream to which the SEI message applies based on the SEI payload type.

The details of one or more examples of the disclosure are set forth in the accompanying drawings and the description below. Other features, objects, and advantages will be apparent from the description, drawings, and claims.

DETAILED DESCRIPTION

Figure 1:
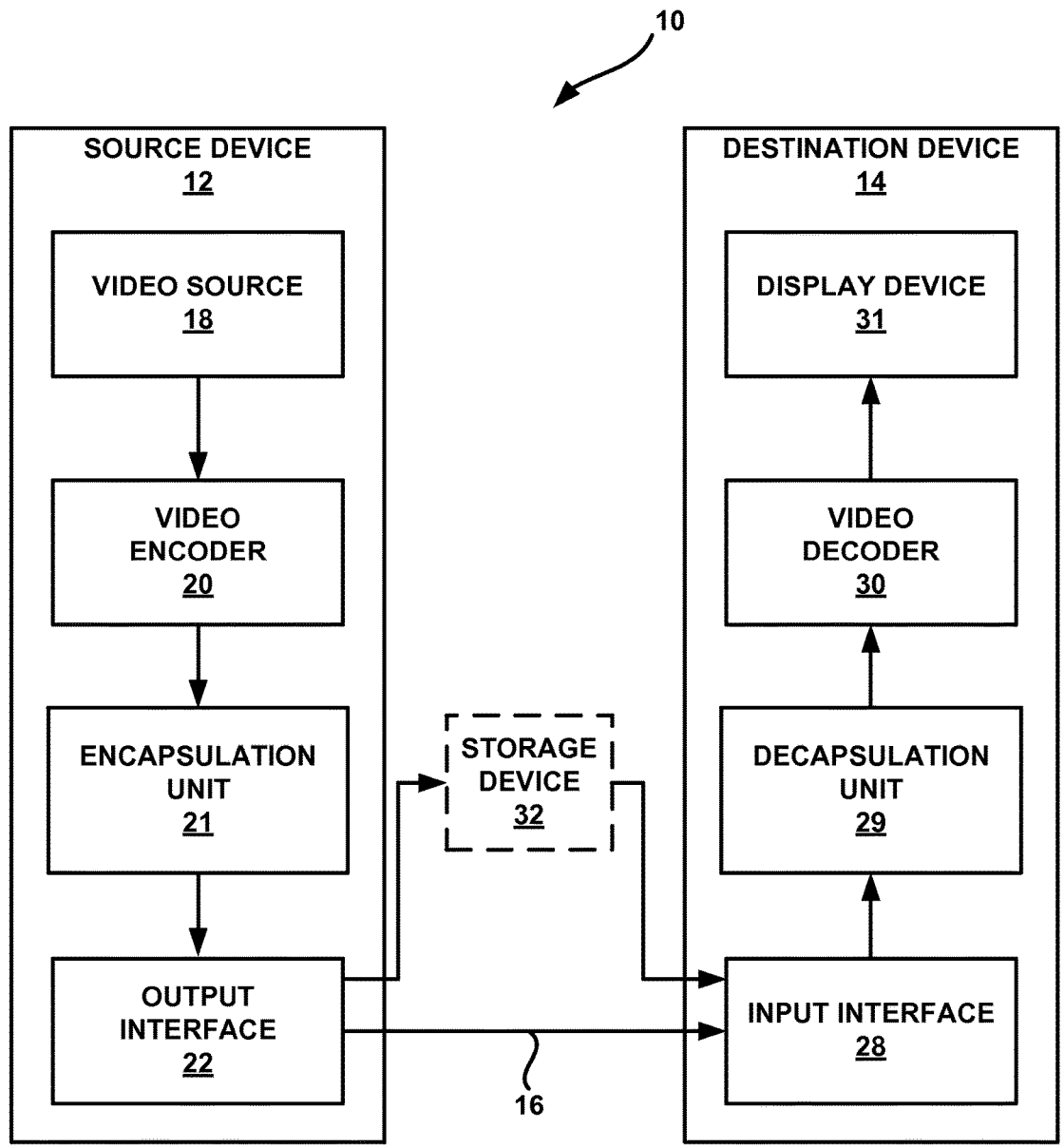
FIG. 1 is a block diagram illustrating an example video encoding and decoding system that may utilize the techniques described in this disclosure.

This disclosure includes techniques for applying supplemental enhancement layer (SEI) messages that are defined in the High Efficiency Video Coding (HEVC) standard in a multi-layer context. In some instances, the techniques may be performed with multi-layer extensions to the HEVC standard such as a Multi-view Video Coding extension to HEVC (MV-HEVC) or a Scalable Video Coding (SVC) extension to HEVC (SHVC), as noted below. The techniques of this disclosure, however, are not limited to any particular video coding standard, and may also or alternatively be used with other extensions to HEVC, other multi-view coding standards and/or other multi-layer video standards. In addition, techniques of this disclosure, as described below, may be applied independently or in combination.

A "layer" of video data may generally refer to a sequence of pictures having at least one common characteristic, such as a view, a frame rate, a resolution, or the like. For example, a layer may include video data associated with a particular view (e.g., perspective) of multi-view video data. As another example, a layer may include video data associated with a particular layer of scalable video data. Thus, this disclosure may interchangeably refer to a layer and a view of video data. That is, a view of video data may be referred to as a layer of video data, and vice versa, and a plurality of views or a plurality of scalable layers may be referred to, in a similar manner, as multiple layers, e.g., in a multi-layer coding system. In addition, a multi-layer codec (also referred to as a multi-layer video coder or multi-layer encoder-decoder) may refer to a multi-view codec or a scalable codec (e.g., a codec configured to encode and/or decode video data using MV-HEVC, SHVC, or another multi-layer coding technique).

A multi-layer bitstream may include a base layer and one or more non-base layers, e.g., in SHVC, or a plurality of views, e.g., in MV-HEVC. In a scalable bitstream, the base layer may typically have a layer identifier that is equal to zero. A non-base layer may have a layer identifier that is greater than zero, and may provide additional video data that is not included in the base layer. For example, a non-base layer of multi-view video data may include an additional view of video data. A non-base layer of scalable video data may include an additional layer of scalable video data. A non-base layer may be interchangeably referred to as an enhancement layer.

An access unit (sometimes abbreviated as AU) of a multi-layer bitstream is, generally, a unit of data including all layer components (e.g., all network abstraction layer (NAL) units) for a common temporal instance. The layer components of an access unit are typically intended to be output together (i.e., output substantially simultaneously), where outputting a picture generally involves transferring pictures from a decoded picture buffer (DPB) (e.g., storing pictures from the DPB to an external memory, sending the pictures from the DPB to a display, or the like).

A bitstream containing an encoded representation of video data may include a series of network abstraction layer (NAL) units. A NAL unit may be a syntax structure containing an indication of the type of data in the NAL unit and bytes containing that data in the form of a raw byte sequence payload (RBSP) interspersed as necessary with emulation prevention bits. The NAL units may include video coding layer (VCL) NAL units and non-VCL NAL units. The VCL NAL units may include coded slices of pictures. A non-VCL NAL unit may encapsulate a video parameter set (VPS), a sequence parameter set (SPS), a picture parameter set (PPS), one or more supplemental enhancement information (SEI) messages, or other types of data.

NAL units of the bitstream may be associated with different layers of the bitstream. In SHVC, as noted above, the layers other than a base layer may be referred to as "enhancement layers" and may include data that improve the quality of playback of the video data. In multi-view coding and 3-dimensional video (3DV) coding, such as MV-HEVC, the layers may include data associated with different views. Each layer of the bitstream is associated with a different layer identifier.

In addition, NAL units may include temporal identifiers. Each operation point of a bitstream has a set of layer identifiers and a temporal identifier. If a NAL unit specifies a layer identifier in the set of layer identifiers for an operation point and the temporal identifier of the NAL unit is less than or equal to the temporal identifier of the operation point, the NAL unit is associated with the operation point.

The SEI mechanism supported in both H.264/AVC and HEVC enables video encoders to include such metadata in the bitstream that is not required for correct decoding, by a video decoder or other device, of the sample values of the output pictures, but can be used for various other purposes, such as picture output timing, displaying, as well as loss detection and concealment. A NAL unit that encapsulates one or more SEI messages is referred to herein as a SEI NAL unit. One type of SEI message is a scalable nesting SEI message. A scalable nesting SEI message is an SEI message that contains one or more additional SEI messages. The scalable nesting SEI message may be used to indicate whether an SEI message applies to particular layers or temporal sub-layers of a multi-layer bitstream. An SEI message that is not contained in a scalable nesting SEI message is referred to herein as a non-nested SEI message.

Certain types of SEI messages contain information that is only applicable to particular operation points. An operation point of a bitstream is associated with a set of layer identifiers and a temporal identifier. An operation point representation may include each NAL unit that is associated with an operation point. An operation point representation may have a different frame rate and/or bit rate than an original bitstream. This is because the operation point representation may not include some pictures and/or some of the data of the original bitstream.

Buffering period SEI messages, picture timing SEI messages, and decoding unit SEI messages may only be applicable to particular operation points. Thus, in order to use the information in such SEI messages, a video processor may determine which operation points are applicable to the SEI messages. Other types of SEI messages are only applicable to particular layers. Thus, in order to use the information in such SET messages, the video processor may determine which layers are applicable to the SEI messages.

Generic use of HEVC SEI messages in the context of multi-layer coding may present several challenges. For example, as described in greater detail below, applying the SEI messages specified in HEVC to multiple layers may increase complexity, create syntax inconsistencies, and/or create other errors that cause a multi-layer video codec to malfunction.

In some examples, the techniques of this disclosure may provide solutions to resolve a variety of issues related to generic use of HEVC SEI messages. For example, the techniques may include applying constraints on certain syntax elements, such that a video encoder or video decoder automatically codes (or automatically determines, without coding) values for the certain syntax elements based on characteristics of a multi-layer bitstream.

FIG. 1 is a block diagram illustrating an example video encoding and decoding system 10 that may utilize the techniques described in this disclosure. As shown in FIG. 1, system 10 includes a source device 12 that generates encoded video data to be decoded at a later time by a destination device 14. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via a link 16. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

Alternatively, encoded data may be output from output interface 22 to a storage device 32. Similarly, encoded data may be accessed from storage device 32 by input interface. Storage device 32 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 32 may correspond to a file server or another intermediate storage device that may hold the encoded video generated by source device 12. Destination device 14 may access stored video data from storage device 32 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 32 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, video encoder 20, encapsulation unit 21, and an output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

The captured, pre-captured, or computer-generated video may be encoded by video encoder 20. Encapsulation unit 21 may form one or more representations of the multimedia content, where each of the representations may include one or more layers. In some examples, video encoder 20 may encode each layer in different ways, e.g., with different frame rates, different bit rates, different resolutions, or other such differences. Thus, encapsulation unit 21 may form various representations having various characteristics, e.g., bit rate, frame rate, resolution, and the like.

Each of the representations may correspond to respective bitstreams that can be retrieved by destination device 14. Encapsulation unit 21 may provide an indication of a range of view identifiers (view_ids) for views included in each representation, e.g., within a media presentation description (MPD) data structure for the multimedia content. For example, encapsulation unit 21 may provide an indication of a maximum view identifier and a minimum view identifier for the views of a representation. The MPD may further provide indications of maximum numbers of views targeted for output for each of a plurality of representations of the multimedia content. The MPD or data thereof may, in some examples, be stored in a manifest for the representation(s).

The encoded video data may be transmitted directly to destination device 14 via output interface 22 of source device 12. The encoded video data may also (or alternatively) be stored onto storage device 32 for later access by destination device 14 or other devices, for decoding and/or playback.

Destination device 14 includes an input interface 28, decapsulation unit 29, a video decoder 30, and a display device 31. In some cases, input interface 28 may include a receiver and/or a modem. Input interface 28 of destination device 14 receives the encoded video data over link 16. The encoded video data communicated over link 16, or provided on storage device 32, may include a variety of syntax elements generated by video encoder 20 for use by a video decoder, such as video decoder 30, in decoding the video data. Such syntax elements may be included with the encoded video data transmitted on a communication medium, stored on a storage medium, or stored on a file server.

Decapsulation unit 29 of destination device 14 may represent a unit that decapsulates SEI messages from a bitstream (or a subset of a bitstream, referred to as an operation point in the context of multi-layer coding). Decapsulation unit 29 may perform operations in an order opposite to those performed by encapsulation unit 21 to decapsulate data from the encapsulated encoded bitstream, such as SEI messages.

Display device 31 may be integrated with, or external to, destination device 14. In some examples, destination device 14 may include an integrated display device and also be configured to interface with an external display device. In other examples, destination device 14 may be a display device. In general, display device 31 displays the decoded video data to a user, and may comprise any of a variety of display devices such as a liquid crystal display (LCD), a plasma display, an organic light emitting diode (OLED) display, or another type of display device.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

This disclosure may generally refer to video encoder 20 "signaling" certain information to another device, such as video decoder 30. The term "signaling" may generally refer to the communication of syntax elements and/or other data used to decode the compressed video data. Such communication may occur in real- or near-real-time. Alternately, such communication may occur over a span of time, such as might occur when storing syntax elements to a computer-readable storage medium in an encoded bitstream at the time of encoding, which then may be retrieved by a decoding device at any time after being stored to this medium.

In some examples, video encoder 20 and video decoder 30 operate according to a video compression standard, such as ISO/IEC MPEG-4 Visual and ITU-T H.264 (also known as ISO/IEC MPEG-4 AVC), including its Scalable Video Coding (SVC) extension, Multiview Video Coding (MVC) extension, and MVC-based 3DV extension. In other examples, video encoder 20 and video decoder 30 may operate according to the High Efficiency Video Coding (HEVC) developed by the Joint Collaboration Team on Video Coding (JCT-VC) of ITU-T Video Coding Experts Group (VCEG) and ISO/IEC Motion Picture Experts Group (MPEG). A draft of the HEVC standard is described in ITU-T H.265, High Efficiency Video Coding, April, 2014 and Wang et al., "High Efficiency Video Coding (HEVC) defect report 3," Joint Collaborative Team on Video Coding (JCT-VC) of ITU-T SG16 WP3 and ISO/IEC JTC1/SC29/WG11, document JCTVC-P1003_v1, $16^{th}$ Meeting, San Jose, January 2014 Wang et al., "High Efficiency Video Coding (HEVC) defect report 3," Joint Collaborative Team on Video Coding (JCT-VC) of ITU-T SG16 WP3 and ISOiIEC JTC1/SC29/WG11, document JCTVC-P1003_v1, $16^{th}$ Meeting, San Jose, January 2014, which provides a third defect report for HEVC Version 1.

Furthermore, there are ongoing efforts to produce scalable video coding, multi-view coding, and 3DV extensions for HEVC. The scalable video coding extension of HEVC may be referred to as SHEVC. A recent Working Draft (WD) of SHVC (referred to as SHVC WD5 or the current SHVC WD hereinafter), is described in Chen et al., "High Efficiency Video Coding (HEVC) scalable extension draft 5," Joint Collaborative Team on Video Coding (JCT-VC) of ITU-T SG16 WP3 and ISO/IEC JTC1/SC29/WG11, document JCTVC-P1008_v4, $16^{th}$ Meeting, San Jose, January 2014. A recent Working Draft (WD) of MV-HEVC (referred to as MV-HEVC WD7 or the current MV-HEVC WD hereinafter) is described in Tech et al., "MV-HEVC Draft Text 7," Joint Collaborative Team on Video Coding (JCT-VC) of ITU-T SG16 WP3 and ISO/IEC JTC1/SC29/WG11, document JCTVC-G1004_v7, $16^{th}$ Meeting, San Jose, January 2014.

In HEVC and other video coding specifications, a video sequence typically includes a series of pictures. Pictures may also be referred to as "frames." A picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may generate a set of coding tree units (CTUs). Each of the CTUs may comprise a coding tree block of luma samples, two corresponding coding tree blocks of chroma samples, and syntax structures used to code the samples of the coding tree blocks. In monochrome pictures or pictures having three separate color planes, a CTU may comprise a single coding tree block and syntax structures used to code the samples of the coding tree block. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in a raster scan order.

To generate a coded CTU, video encoder 20 may recursively perform quad-tree partitioning on the coding tree blocks of a CTU to divide the coding tree blocks into coding blocks, hence the name "coding tree units." A coding block may be an N×N block of samples. A CU may comprise a coding block of luma samples and two corresponding coding blocks of chroma samples of a picture that has a luma sample array, a Cb sample array, and a Cr sample array, and syntax structures used to code the samples of the coding blocks. In monochrome pictures or pictures having three separate color planes, a CU may comprise a single coding block and syntax structures used to code the samples of the coding block.

Video encoder 20 may partition a coding block of a CU into one or more prediction blocks. A prediction block is a rectangular (i.e., square or non-square) block of samples on which the same prediction is applied. A prediction unit (PU) of a CU may comprise a prediction block of luma samples, two corresponding prediction blocks of chroma samples, and syntax structures used to predict the prediction blocks. In monochrome pictures or pictures having three separate color planes, a PU may comprise a single prediction block and syntax structures used to predict the prediction block. Video encoder 20 may generate predictive luma. Cb, and Cr blocks for luma, Cb, and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU. If video encoder 20 uses inter prediction to generate the predictive blocks of a PU, video encoder 20 may generate the predictive blocks of the PU based on decoded samples of one or more pictures other than the picture associated with the PU.

After video encoder 20 generates predictive luma, Cb, and Cr blocks for one or more PUs of a CU, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the luma, Cb, and Cr residual blocks of a CU into one or more luma, Cb, and Cr transform blocks. A transform block is a rectangular (e.g., square or non-square) block of samples on which the same transform is applied. A transform unit (TU) of a CU may comprise a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients.

Video encoder 20 may output a bitstream that includes a sequence of bits that forms a representation of coded pictures and associated data. The bitstream may comprise a sequence of network abstraction layer (NAL) units. A NAL unit is a syntax structure containing an indication of the type of data in the NAL unit and bytes containing that data in the form of a raw byte sequence payload (RBSP) interspersed as necessary with emulation prevention bits. Each of the NAL units includes a NAL unit header and encapsulates a RBSP. The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate an RBSP for a picture parameter set (PPS), a second type of NAL unit may encapsulate an RBSP for a coded slice, a third type of NAL unit may encapsulate an RBSP for SEI, and so on. NAL units that encapsulate RBSPs for video coding data (as opposed to RBSPs for parameter sets and SEI messages) may be referred to as video coding layer (VCL) NAL units.

Video decoder 30 may receive a bitstream generated by video encoder 20. In addition, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 20. In addition, video decoder 30 may inverse quantize coefficient blocks associated with TUs of a current CU. Video decoder 30 may perform inverse transforms on the coefficient blocks to reconstruct transform blocks associated with the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

In multi-view coding, there may be multiple views of the same scene from different viewpoints. As noted above, an access unit includes a set of pictures that correspond to the same time instance. Thus, video data may be conceptualized as a series of access units occurring over time. A "view component" may be a coded representation of a view in a single access unit. In this disclosure, a "view" may refer to a sequence of view components associated with the same view identifier. Example types of view components include texture view components and depth view components.

Multi-view coding supports inter-view prediction. Inter-view prediction is similar to the inter prediction used in HEVC and may use the same syntax elements. However, when a video coder performs inter-view prediction on a current video unit (such as a PU), video encoder 20 may use, as a reference picture, a picture that is in the same access unit as the current video unit, but in a different view. In contrast, conventional inter prediction only uses pictures in different access units as reference pictures.

In multi-view coding, a view may be referred to as a "base view" if a video decoder (e.g., video decoder 30) can decode pictures in the view without reference to pictures in any other view. When coding a picture in one of the non-base views, a video coder (such as video encoder 20 or video decoder 30) may add a picture into a reference picture list if the picture is in a different view but within a same time instance (i.e., access unit) as the picture that the video coder is currently coding. Like other inter prediction reference pictures, the video coder may insert an inter-view prediction reference picture at any position of a reference picture list.

The SEI mechanism supported in both H.264/AVC and HEVC enables video encoders (e.g., video encoder 20) to include such metadata in the bitstream that is not required for correct decoding of the sample values of the output pictures, but can be used for various other purposes, such as picture output timing, displaying, as well as loss detection and concealment. Video encoder 20 may use SEI messages to include, in the bitstream, metadata that is not required for correct decoding of the sample values of pictures. However, video decoder 30 or other devices may use the metadata included in SEI messages for various other purposes. For example, video decoder 30 or another device may use the metadata in SEI messages for picture output timing, picture displaying, loss detection, and error concealment.

Video encoder 20 may include one or more SEI NAL units in an access unit. In other words, any number of SEI NAL units may be associated with an access unit. Furthermore, each SEI NAL unit may contain one or more SEI messages. That is, video encoders can include any number of SEI NAL units in an access unit, and each SET NAL unit may contain one or more SEI messages. A SEI NAL unit may include a NAL unit header and a payload. The NAL unit header of the SEI NAL unit includes at least a first syntax element and a second syntax element. The first syntax element specifies a layer identifier of the SEI NAL unit. The second syntax element specifies a temporal identifier of the SEI NAL unit.

A nested SEI message refers to an SEI message that is contained in a scalable nesting SEI message. A non-nested SEI message refers to an SEI message that is not contained in a scalable nesting SEI message. The payload of the SEI NAL unit may comprise a nested SEI message or a non-nested SEI message.

The HEVC standard describes the syntax and semantics for various types of SEI messages. However, the HEVC standard does not describe the handling of the SET messages because the SEI messages do not affect the normative decoding process. One reason to have SEI messages in the HEVC standard is to enable supplemental data being interpreted identically in different systems using HEVC. Specifications and systems using HEVC may require video encoders to generate certain SEI messages or may define specific handling of particular types of received SEI messages.

Table 1, below, lists SEI messages specified in HEVC and briefly describes their purposes:

TABLE 1

Overview of SEI messages

| SEI message | Purpose |
| --- | --- |
| Buffering period | Initial delays for hypothetical reference decoder (HRD) operation |
| Picture timing | Picture output time and picture/sub-picture removal time for HRD operation, as well as picture structure related information |
| Pan-scan rectangle | Displaying at a different picture aspect ratio (PAR) than the PAR of the output pictures |
| Filler payload | Adjusting the bitrate to meet specific constraints |
| User data registered User data unregistered | SEI messages to be specified by external entities |
| Recovery point | Additional information for clean random access. Gradual decoding refresh. |
| Scene information | Information about scene changes and transitions |
| Full-frame snapshot | Indication to label the associated decoded picture as a still-image snapshot of the video content |
| Progressive refinement segment | Indicates that certain consecutive pictures represent a progressive refinement of the quality of a picture rather than a moving scene |
| Film grain characteristics | Enables decoders to synthesize film grain |
| Deblocking filter display preference | Recommends whether or not displayed pictures should undergo the in-loop deblocking filter process |
| Post-filter hint | Provides suggested post-filter coefficients or correlation information for post-filter design |
| Tone mapping information | Remapping to another color space than that used or assumed in encoding |
| Frame packing arrangement | Packing of stereoscopic video into an HEVC bitstream |
| Display orientation | Specifies flipping and/or rotation that should be applied to the output pictures when they are displayed |
| Structure of pictures description | Describes the temporal and inter prediction structure of the bitstream |
| Decoded picture hash | Checksum of the decoded picture, which may be used for error detection |
| Active parameter sets | Provides information on of active VPS, SPS, etc. |
| Decoding unit information | Sub-picture removal time for HRD operation, as well as decoding unit index |
| Temporal level zero index | Provides temporal level zero index values |
| Scalable nesting | Provides a mechanism to nest SEI messages for association to different operation points and layers |
| Region refresh information | Provides information on refreshed and non-refreshed region for gradual decoding refresh |

One potential issue with using HEVC SEI messages in a multi-layer context is that an SEI NAL unit containing an SEI message that applies to a layer with a layer identifier (e.g., as identified by a nuh_layer_id syntax element of the bitstream) that is equal to a first layer (layerIdA for purposes of example) is permitted to follow a VCL NAL unit of a picture with a layer identifier (nuh_layer_id) that is greater than the first layer (layerIdA) within an access unit (AU) that contains pictures of the layers. For example, an SEI message may be separated in the bitstream from the picture using the SEI message.

In an example for purposes of illustration, an access unit may include a first picture of a first layer of a multi-layer bitstream and a second picture of a second layer of a multi-layer bitstream. In some instances, an SEI message that is applicable to the first picture of the first layer may be included with the NAL units associated with the second layer. If an SEI NAL unit is permitted to be included with other layers of video data, video encoder 20 and/or video decoder 30 may have to extract the SEI NAL unit from the other layers and store the message prior to coding the access unit.

According to a first aspect of this disclosure, an SEI NAL unit containing an SEI message that applies to a layer with a layer identifier (nuh_layer_id) that is equal to a first layer (layerIdA) is disallowed to follow any VCL NAL unit as well as its associated non-VCL NAL units of a picture with a layer identifier (nuh_layer_id) that is greater than the first layer (layerIdA) within the access unit. For example, according to aspects of this disclosure, placement of SEI NAL units may be constrained such that an SEI NAL unit is together with the layer (or layers) to which the SEI NAL unit applies in the multi-layer bitstream.

In the example above, video encoder 20 and/or video decoder 30 may only code one or more non-VCL NAL units containing an SEI message applicable to VCL NAL units of a first layer together with the VCL NAL units of the first layer (e.g., successively code the SEI NAL unit and VCL NAL units), such that the bitstream does not contain any coded pictures of any other layer of the multi-layer bitstream between the VCL NAL units of the first layer and the non-VCL NAL units containing the SEI message applicable to the VCL NAL units of the first layer. In some instances, having the SEI NAL unit together in a multi-layer bitstream with the pictures in the layers to which the SEI NAL unit applies may be beneficial, e.g., in minimizing storage or transmission overhead when storing and transmitting associated NAL units together. For example, by keeping the non-VCL and VCL NAL units to which the non-VCL NAL units apply together in the bitstream, video encoder 20 and/or video decoder 30 may not have to locate and fetch the non-VCL NAL units from memory prior to coding the VCL NAL units.

A second potential issue with using HEVC SEI messages in a multi-layer context is that a set of applicable layers of a multi-layer bitstream to which a decoded picture hash SEI message is not clearly specified in the HEVC standard. The decoded picture hash SEI message provides a checksum derived from the sample values of a decoded picture. The decoded picture hash message may be used for detecting whether a picture was correctly received and decoded.

According to a second aspect of this disclosure, the set of applicable layers of a decoded picture hash SEI message may be specified to be the layer with the layer identifier (nuh_layer_id) that is equal to the layer identifier (nuh_layer_id) of the SEI NAL unit containing the SEI message and the decoded picture hash SEI message is not permitted to be nested. For example, according to aspects of this disclosure, video encoder 20 and/or video decoder 30 may only code one decoded picture hash SET message in an SEI NAL unit as a non-nested SEI message and the decoded picture hash SEI message only applies to the layer that has the same layer identifier (nuh_layer_id) of the SEI NAL unit that contains the SEI message.

In the example above, video encoder 20 and/or video decoder 30 may code one or more non-VCL NAL units (e.g., SEI NAL units) containing a decoded picture hash SEI message, and determine a set of layers of the multi-layer bitstream to which the decoded picture hash SEI message is applicable based on a layer identifier of the one or more non-VCL NAL units containing the decoded picture hash SEI message. Video encoder 20 and/or video decoder 30 may code one or more syntax elements that indicate the layer identifier for the SEI NAL unit, such as a nuh_layer_id syntax element, such that determining the set of layers is based on the syntax element. The techniques may, in some instances, increase error resilience and/or reduce storage overhead associated with decoded picture hash SEI messages in multi-layer coding.

A third potential issue with using HEVC SEI messages in a multi-layer context is that the set of applicable layers of an active parameter sets SEI message is not clearly specified in the HEVC standard. The active parameter sets SEI message indicates which VPS is active for the VCL NAL units of the access unit associated with the SET message. The SEI message may also provide information on which SPS is active for the VCL NAL units of the access unit associated with the SEI message, and other information related to parameter sets. For example, the SEI message may include an indication of whether full random accessibility is supported (e.g., when supported, all parameter sets needed for decoding of the remaining pictures of the bitstream when random accessing from the beginning of the current coded video sequence by completely discarding all access units earlier in decoding order are present in the remaining bitstream and all coded pictures in the remaining bitstream can be correctly decoded), or whether there is no parameter set within the current coded video sequence that updates another parameter set of the same type preceding in decoding order (e.g., an update of a parameter set refers to the use of the same parameter set identifier, but with some other parameters changed).

According to a third aspect of this disclosure, an active parameter sets SEI message is defined to apply to all layers in the bitstream. In addition, the active parameter sets SEI message is constrained from being nested. In this example, video encoder 20 and/or video decoder 30 may code one or more non-VCL NAL units of a multi-layer bitstream that contain an active parameter sets SEI message, and determine that the active parameter sets SEI message is applicable to all layers of the multi-layer bitstream based on the one or more non-VCL NAL units containing the active parameter set SEI message. For example, video encoder 20 and/or video decoder 30 may automatically derive that the active parameter sets SEI message applies to all layers of the multi-layer bitstream by virtue of coding the active parameter sets SEI message. In some instances, the techniques may reduce the complexity associated with active parameter sets SEI messages in multi-layer coding.

A fourth potential issue with using HEVC SEI messages in a multi-layer context is that when a frame_field_info_present_flag syntax element is equal to one for a picture timing information SEI message, nested or non-nested, the set of applicable layers is not clearly specified for the frame-field information carried in the syntax elements pic_struct, source_scan_type, and duplicate_flag. For example, a frame_field_info_present_flag syntax element that is equal to one specifies that picture timing SEI messages are present for every picture and include the pic_struct, source_scan_type, and duplicate_flag syntax elements. In general, the pic_struct syntax element indicates whether a picture should be displayed as a frame or as one or more fields, the source_scan_type syntax element indicates a scan type (e.g., progressive, interlaced, or unknown), and the duplicate_flag syntax element indicates that the current picture is indicated to be a duplicate of a previous picture in output order.

According to a fourth aspect of this disclosure, when the frame_field_info_present_flag syntax element is equal to one for a picture timing information SEI message, nested or non-nested, video encoder 20 and/or video decoder 30 may automatically determine that the frame-field information carried in the syntax elements pic_struct, source_scan_type, and duplicate_flag applies to the layers in all of the operation points to which the picture timing SEI message applies. In this manner, in some instances, the techniques may reduce the complexity and/or improve error resilience when using the frame_field_info_present_flag syntax element in multi-layer coding.

A fifth potential issue with using HEVC SEI messages in a multi-layer context is that an active parameter sets SEI message is permitted to be nested in HEVC. However, as noted above, the active parameter sets SEI message is applicable to all layers. Accordingly, providing the flexibility of the active parameter sets SEI message to be applied to particular layers of a multi-layer bitstream (e.g., using a nesting SEI message) may needlessly increase the complexity of video encoder 20 and/or video decoder 30. For example, upon receiving and decoding a scalable nesting SEI message, video decoder 30 may have to perform additional operations (e.g., versus non-nested SET messages) to determine the applicable layers for the scalable nesting SEI message.

According to a fifth aspect of this disclosure, an active parameter sets SEI message is disallowed to be nested in a scalable nesting SEI message. For example, video encoder 20 and/or video decoder 30 may be constrained to code an active parameter sets SEI message of a multi-layer bitstream only in a non-nested SEI message and not in a scalable nesting SEI message. The techniques may reduce the computational complexity associated with coding and using active parameter sets SEI messages. For example, returning to the example above, video decoder 30 may code and use the active parameter sets SEI message without performing the additional operations associated with scalable nesting SEI messages.

A sixth potential issue with using HEVC SEI messages in a multi-layer context is that the semantics of a nested SEI message having a bitstream_subset_flag syntax element that is equal to one and a payloadType equal to 2, 3, 6, 9, 15, 16, 17, 19, 22, 23, 45, 47, 128, 131, 132 or 134 (e.g., one of the SEI messages that have a payloadType that is not equal to any of 0, 1, 4, 5, 130, and 133) are not clear. In HEVC, the bitstream_subset_flag indicates whether the SEI messages contained in the scalable nesting SEI message apply to specific layers or sub-layers of a multi-layer bitstream. For example, a bitstream_subset_flag that is equal to zero specifies that the SEI messages contained in the scalable nesting SEI message apply to specific layers or sub-layers. A bitstream_subset_flag that is equal to one specifies that the SEI messages contained in the scalable nesting SEI message apply to one or more sub-bitstreams resulting from a sub-bitstream extraction process. Hence, HEVC does not clearly specify the manner in which particular SEI messages (having the payload types identified above) are handled when a particular layer set (e.g., a sub-bitstream) is extracted from a multi-layer bitstream, which may create errors and/or inefficiencies during multi-layer coding.

When payloadType is equal to 2, 3, 6, 9, 15, 16, 17, 19, 22, 23, 45, 47, 128, 129, 131, 132 or 134, the SEI message is one of: a pan-scan rectangle SEI message that includes data associated with displaying at a different picture aspect ratio than a picture aspect ratio of output pictures; a filler payload SEI message that includes data for adjusting a bit rate to meet specific constraints; a recovery point SEI message that includes information for clean random access or gradual decoding refresh; a scene information SEI message that includes information associated with scene changes and transitions; a picture snapshot SEI message that includes an indication to label an associated decoded picture as a still-image snapshot of video content; a progressive refinement segment start SEI message that includes information associated with a start of a segment of consecutive pictures that represent a progressive refinement of quality of a picture rather than a moving scene; a progressive refinement segment end SET message that includes information associated with an end of the segment of consecutive pictures; a film grain characteristics SEI message that includes information associated with synthesizing film grain effects; a post filter hint SEI message that includes information associated with suggested post-filter coefficients or correlation information for post-filter design; a tone mapping information SEI message that includes information associated with remapping to another color space than that used or assumed in encoding; a frame packing arrangement SEI message that includes information associated with packing of stereoscopic video into the bitstream; a display orientation SEI message that includes information that specifies flipping and/or rotation to be applied to the output pictures when the output pictures are displayed; a structure of pictures information SEI message that includes information that describes temporal and inter prediction structure of the bitstream; a temporal sub-layer zero index SEI message that indicates a temporal sub-layer zero index; a decoded picture has SEI message, or a region refresh information SEI message that indicates whether the slice segments associated with the current SEI message belong to the refreshed region in the current picture, respectively.

When payloadType is equal to 0, 1, 4, 5, 130, and 133, the SEI message is one of: a buffering period SEI message, a picture timing SEI message, a user registered SEI message, a user unregistered SEI message, a decoding unit information SEI message, or a scalable nesting SEI message, respectively.

According to a sixth aspect of this disclosure, when a scalable nesting SEI message contains an SEI message that has payloadType that is equal to 2, 3, 6, 9, 15, 16, 17, 19, 22, 23, 45, 47, 128, 131, 132, or 134 (e.g., one of the SEI messages that have payloadType that is not equal to any of 0, 1, 4, 5, 130, and 133), the value of the syntax element bitstream_subset_flag of the scalable nesting SEI message is required to be equal to 0. For example, according to aspects of this disclosure, video encoder 20 and/or video decoder 30 may automatically determine and/or code the syntax element bitstream_subset_flag based on the payload type of the SEI message being included in a predetermined set of SEI messages. The predetermined set of SEI messages may be SEI messages that are applied to a single layer. In this manner, video encoder 20 and/or video decoder 30 are constrained from applying the SEI message included in the above-identified set from being applied to more than one layer in a multi-layer bitstream, thereby potentially reducing errors and/or inefficiencies during multi-layer coding.

A seventh potential issue with using HEVC SEI messages in a multi-layer context is that it is unclear what the layer identifier value (nuh_layer_id) should be for an SEI NAL unit containing a non-nested buffering period, picture timing, or decoding unit information SEI message. A buffering period SEI message provides an initial coded picture buffer (CPB) removal delay and initial CPB removal delay offset information for initialization of the HRD at the position of the associated access unit in decoding order. The picture timing SEI message provides a picture output time and picture/sub-picture removal time for HRD operation, as well as picture structure related information. A decoding unit information SEI message provides CPB removal delay information for a decoding unit. The message may be used in very-low-delay buffering operations. Accordingly, the above-noted SEI messages provide information that is needed by the HRD and the SEI message are applicable to a layer set (e.g., a self-contained set of layers also referred to as a sub-bitstream). If such SEI messages are not nested and the layer identifier is not zero, it is unclear to which layer sets the messages apply, which may create errors during multi-layer coding.

According to a seventh aspect of this disclosure, the value of the layer identifier (nuh_layer_id) for an SEI NAL unit containing a non-nested buffering period, picture timing, or decoding unit information SEI message is required to be equal to 0. For example, according to aspects of this disclosure, video encoder 20 and/or video decoder 30 may automatically determine that a layer identifier of the layer is zero valued (and/or code a zero value for the layer identifier syntax element) based on the one or more non-VCL NAL units containing the SEI message containing a non-nested buffering period SEI message, a picture timing SEI message, or a decoding unit information SEI message. In this manner, the techniques may potentially reduce errors and/or inefficiencies during multi-layer coding.

An eighth potential issue with using HEVC SEI messages in a multi-layer context is that it is unclear what the value of a layer identifier syntax element (nuh_layer_id) should be for a non-nested SEI message having a payloadType equal to 2, 3, 6, 9, 15, 16, 17, 19, 22, 23, 45, 47, 128, 131, 132, or 134 (i.e. one of the SEI messages that have payloadType not equal to any of 0, 1, 129, 130, and 133). For example, HEVC does not clearly specify the manner in which particular SEI messages (having the payload types identified above) are handled for particular layers (having a particular layer identifier) of a multi-layer bitstream, which may create errors and/or inefficiencies during multi-layer coding.

According to an eighth aspect of this disclosure, when a non-nested SEI message has payloadType equal to 2, 3, 6, 9, 15, 16, 17, 19, 22, 23, 45, 47, 128, 131, 132, or 134 (i.e. one of the SEI messages that have payloadType not equal to any of 0, 1, 129, 130, and 133), a value of a layer identifier (nuh_layer_id) for the SEI NAL unit containing the non-nested SEI message is required to be equal to the layer identifier (nuh_layer_id) of the SEI NAL unit's associated VCL NAL units. That is, for example, video encoder 20 and/or video decoder 30 may automatically determine, based on the SEI payload type being included in a first set of payload types (e.g., the payload types identified above), that a layer identifier syntax element for the non-VCL NAL units containing the SEI message is equal to a layer identifier syntax element of the VCL NAL units associated with the SEI message.

A ninth potential issue with using HEVC SEI messages in a multi-layer context is that a prefix SEI message is required in HEVC to be present and precede the first VCL NAL unit of an access unit in instances in which there is a prefix SEI message of the same type between two VCL NAL units of the access unit. For example, prefix SEI messages are typically included in a bitstream prior to the VCL NAL units to which the SEI message applies. In HEVC, the restriction on the placement of prefix SEI messages is access unit based, which may present an issue for access units having multiple layer components (e.g., access units having pictures from multiple layers). That is, some prefix SEI messages may not be located in the appropriate location (e.g., prior to the VCL NAL units to which the SEI message applies) in access units having multiple layer components.

According to a ninth aspect of this disclosure, video encoder 20 and/or video decoder 30 may control the manner in which prefix SEI messages are coded based on the picture to which the prefix SEI messages apply (e.g., in contrast to the above-noted access unit based techniques). For example, according to aspects of this disclosure, a prefix SEI message that applies to a layer (e.g., layerA) containing a picture is required to be present and precede the first VCL NAL unit of the picture in instances in which there is a prefix SEI message that is of the same type and applies to the layer (e.g., layerA) present between two VCL NAL units of the picture.

For example, for an access unit that includes at least a first picture and a second picture, video encoder 20 and/or video decoder 30 may be constrained to code one or more non-VCL NAL units containing a first prefix SEI message applicable to VCL NAL units of the first picture, and one or more non-VCL NAL units containing a second prefix SEI message applicable to VCL NAL units of the second picture following the first picture in the bitstream. In this manner, video encoder 20 and/or video decoder 30 are constrained from coding prefix SEI messages in other locations of an access unit, which may increase efficiency and reduce storage overhead for multi-layer coding.

A tenth potential issue with using HEVC SEI messages in a multi-layer context is that, in HEVC, a suffix SEI message is required to be present and succeed (follow) the last VCL NAL unit of an access unit when there is a suffix SEI message of the same type between two VCL NAL units of the access unit. For example, suffix SEI message is typically included in a bitstream after the VCL NAL units to which the SEI message applies. In HEVC, the restriction on the placement of suffix SEI messages is access unit based, which may present an issue for access units having multiple layer components (e.g., access units of a multi-layer bitstream). That is, some suffix SEI messages may not be located in the appropriate location (e.g., following to the VCL NAL units to which the SEI message applies) in access units having multiple layer components.

According to a tenth aspect of this disclosure, video encoder 20 and/or video decoder 30 may control the manner in which suffix SEI messages are coded based on the picture to which the suffix SEI messages apply (e.g., in contrast to the above-noted access unit based techniques). For example, according to aspects of this disclosure, a suffix SEI message that applies to a layer (e.g., layerA) containing a picture is required to be present and succeed (follow) the last VCL NAL unit of the picture when there is a suffix SEI message that is of the same type and applies to the layer (e.g., layerA) present between two VCL NAL units of the picture.

For example, for an access unit that includes at least a first picture and a second picture, video encoder 20 and/or video decoder 30 may be constrained to code one or more non-VCL NAL units containing a first suffix SEI message applicable to VCL NAL units of the first picture following the first picture, and one or more non-VCL NAL units containing a second prefix SEI message applicable to VCL NAL units of the second picture following the second picture in the bitstream. In this manner, video encoder 20 and/or video decoder 30 are constrained from coding suffix SEI messages in other locations of an access unit, which may increase efficiency and reduce storage overhead for multi-layer coding.

An eleventh potential issue with using HEVC SEI messages in a multi-layer context is that, in HEVC, the number of times an SEI message is permitted to be repeated is specified per access unit. For example, in some instances, an SEI message may be repeated when coding a picture. In an example for purposes of illustration, for a picture having eight slices, each slice being associated with its own VCL NAL unit, video encoder 20 and/or video decoder 30 may repeat a particular SEI message for each VCL NAL unit. However, an access unit-based restriction on the number of times an SEI message may be repeated may present an issue in multi-layer video coding, because an access unit having multiple layer components may potentially have many more slices than an access unit having a single layer component (e.g., a single picture). In this example, error performance (and/or other functions impacted by SEI messages) may be adversely affected.

According to an eleventh aspect of this disclosure, video encoder 20 and/or video decoder 30 may specify the number of times an SEI message may be repeated on a per picture basis. In this context, a picture may be defined as containing the VCL NAL units of a coded picture and the non-VCL NAL units that are associated with the VCL NAL units. Hence, according to aspects of this disclosure, video encoder 20 and/or video decoder 30 may determine a maximum repetition parameter for an SEI message (e.g., a maximum number of times that the SEI message may be repeated) based on a picture unit that contains VCL NAL units of a picture and associated non-VCL NAL units of the picture. The techniques may, in some instances, increase error resilience in multi-layer coding.

A twelfth potential issue with using HEVC SEI messages in a multi-layer context is that a conflict may arise in instances in which a default op_flag_syntax element is equal to one, and a bitstream_subset_flag syntax element is equal to one, but there are no layer sets specified by a VPS for the bitstream that includes and only includes the layers having layer identifier values (nuh_layer_id) in the range of 0 to nuh_layer_id of the current SEI NAL unit, inclusive. For example, a default_op_flag syntax element that is equal to one specifies that a maxTemporalId[0] is equal to nuh_temporal_id_plus1 of the current SEI NAL unit minus1 and that nestingLayerIdList[0] contains all integer values in the range of 0 to nuh_layer_id of the current SEI NAL unit, inclusive, in increasing order of the values. As noted above, a bitstream_subset_flag syntax element equal to one specifies that the SEI messages contained in the scalable nesting SEI message apply to one or more sub-bitstreams resulting from a sub-bitstream extraction process. In other words, a conflict may arise in instances in which a default layer set of a multi-layer bitstream is indicated, but the VPS does not specify a particular layer set that corresponds to the default layer set.

According to a twelfth aspect of this disclosure, when a bitstream_subset_flag syntax element is equal to one and none of the layer sets specified by a VPS includes and only includes the layers having nuh_layer_id values in the range of 0 to nuh_layer_id of the current SEI NAL unit, inclusive, the value of the default_op_flag syntax element is required to be equal to zero. For example, video encoder 20 and/or video decoder 30 may code a bitstream_subset_flag syntax element of a multi-layer bitstream, and, based on the bitstream_subset_flag being equal to one and no layer sets specified by VPS of the multi-layer bitstream including layer identifiers in the range of zero to a layer identifier of the non-VCL NAL units containing the SEI message, inclusive, determine that a value of a default_op_flag syntax element of the multi-layer bitstream is zero valued. The techniques may improve error resilience when using the default_op_flag syntax element in multi-layer coding.

A thirteenth potential issue with using HEVC SEI messages in a multi-layer context is that when a nesting_op_flag syntax element is equal to zero and an all_layers_flag syntax element is equal one, the value of the variable maxTemporalId[0] is unspecified in HEVC. A nesting_op_flag syntax element that is equal to zero specifies that the list nestingLayerIdList[0] is specified by an all_layers_flag syntax element and, when present, nesting_layer_id[i] for all i values in the range of 0 to nesting_num_layers_minus1, inclusive, and that the variable maxTemporalId[0] is specified by nesting_no_op_max_temporal_id_plus1. In other words, HEVC does not specify the applicable sub-layers (e.g., as identified using the maxTemporalId[0] variable) when nested SEI messages are used with temporal sub-layers of a multi-layer bitstream, which may cause unnecessary complications.

According to a thirteenth aspect of this disclosure, when a nesting_op_flag syntax element is equal to zero and an all_layers_flag syntax element is equal one, video encoder 20 and video decoder 30 may automatically code a maxTemporalId[0] syntax element to have a value of six, which is the maximum possible value for the TemporalId syntax element. That is, according to aspects of this disclosure, video encoder 20 and/or video decoder 30 may be configured to apply an SEI message to all sub-layers that are included in a layer of video data, regardless of the number of sub-layers that are included. In this manner, the techniques may reduce the complexity associated with multi-layer coding.

A fourteenth potential issue with using HEVC SEI messages in a multi-layer context is that, when a nested SEI message has payloadType equal to 2, 3, 6, 9, 15, 16, 17, 19, 22, 23, 45, 47, 128, 131, 132, or 134 (e.g., one of the SEI messages that have payloadType not equal to any of 0, 1, 4, 5, 130, and 133) and the SEI message applies to a set of layers, the set of layers may be associated with a value of maxTemporalId[i] that is less than the greatest value of TemporalId in the bitstream. However, the semantics of these SEI messages are described without considering sub-layers, and are consequently inconsistent with the semantics of the scalable nesting SEI message when the above situation occurs. This inconsistency may needlessly increase the complexity of multi-layer coding.

According to a fourteenth aspect of this disclosure, when a nested SEI message has payloadType equal to 2, 3, 6, 9, 15, 16, 17, 19, 22, 23, 45, 47, 128, 131, 132, or 134 (e.g., one of the SEI messages that have payloadType not equal to any of 0, 1, 4, 5, 130, and 133), the SEI NAL unit containing the scalable nesting SEI message is required to have a TemporalId syntax element that is equal to zero and a maxTemporalId[i] syntax element for all i to be equal to six, which is the maximum possible value for the TemporalId syntax element. For example, video encoder 20 and/or video decoder 30 may be configured to automatically determine a value for the TemporalId syntax element that is equal to zero and a maxTemporalId[i] syntax element for all i that is equal to six based on an SEI message having a payload type in a predetermined set of payload types (e.g., the types identified above). In this manner, the techniques may reduce the complexity associated with multi-layer coding.

A fifteenth potential issue with using HEVC SEI messages in a multi-layer context is that when a bitstream_subset_flag syntax element is equal to one and a nesting_op_flag syntax element is equal to zero, the HEVC standard permits a nestingLayeridList[0] syntax element to correspond to a layer set that is not specified by a VPS for the multi-layer bitstream.

According to a fifteenth aspect of this disclosure, when a bitstream_subset_flag syntax element is equal to one and a nesting_op_flag syntax element is equal to zero, video encoder 20 and/or video decoder 30 may be configured to code the nestingLayeridList[0] syntax element to include and only include the nuh_layer_id values of one of the layer sets specified by the VPS. For example, video encoder 20 and/or video decoder 30 may be configured to code a bitstream_subset_flag syntax element of the multi-layer bitstream and a nesting_op_flag syntax element of the multi-layer bitstream, and, based on the bitstream_subset_flag syntax element having a value of one and the nesting_op_flag syntax element having a value of zero, determine that a nestingLayeridList[0] of the multi-layer bitstream includes only layer identifier values of a layer set specified in a VPS of the multi-layer bitstream. In this manner, the techniques may reduce the complexity associated with multi-layer coding.

The techniques described above may be applied independently or applied in combination. Detailed examples that are consistent with this disclosure are set forth below. Text changes relative to the above-noted SHVC standard for some of the techniques described above are indicated using underlines to identify inserted material and double brackets ([[removed:]]) to indicate deleted material below:

Change the following definitions in clause 3 as follows:

3.X access unit: A set of NAL units that are associated with each other according to a specified classification rule, are consecutive in decoding order, and contain the VCL NAL units of all coded pictures associated with the same output time and their associated non-VCL NAL units.

NOTE—Pictures in the same access unit are associated with the same picture order count.

Add the following definitions to clause 3:
3.X base bitstream partition: A bitstream partition that is also a conforming bitstream itself.
3.X bitstream partition: A sequence of bits, in the form of a NAL unit stream or a byte stream, that is a subset of a bitstream according to a partitioning.
3.X output layer: A layer of an output layer set that is output when TargetOptLayerSetIdx is equal to the index of the output layer set.
3.X output layer set: A set of layers consisting of the layers of one of the specified layer sets, where one or more layers in the set of layers are indicated to be output layers.
3.X output operation point: A bitstream that is created from another bitstream by operation of the sub-bitstream extraction process with the another bitstream, a target highest TemporalId, and a target layer identifier list as inputs, and that is associated with a set of target output layers.
3.X picture unit: A set of NAL units that are associated with each other according to a specified classification rule, are consecutive in decoding order, and contain the VCL NAL units of a coded picture and their associated non-VCL NAL units.
3.X target output layer: A layer that is to be output and is one of the output layers of the output layer set with index olsIdx such that TargetOptLayerSetIdx is equal to olsIdx.
3.X target output layer set: An output layer set associated with variable TargetOptLayerSetIdx that specifies a layer identifier list of an output operation point in use and a set of target output layers.
[[Removed: 3.X operation point: A bitstream that is created from another bitstream by operation of the sub-bitstream extraction process with the another bitstream, a target highest TemporalId, and a target layer identifier list as inputs, and that is associated with a set of target output layers.
   NOTE 14—If the target highest TemporalId of an operation point is equal to the greatest value of TemporalId in the layer set associated with the target layer identification list, the operation point is identical to the layer set. Otherwise it is a subset of the layer set.]]

C.1 General

This annex specifies the hypothetical reference decoder (HRD) and its use to check bitstream and decoder conformance.

. . .

Multiple tests may be needed for checking the conformance of a bitstream, which is referred to as the bitstream under test. For each test, the following steps apply in the order listed:
1. An output operation point under test, denoted as TargetOp, is selected by selecting a target output layer set identified by TargetOutputLayerSetIdx and selecting a target highest TemporalId value HighestTid. The value of TargetOutputLayerSetIdx shall be in the range of 0 to NumOutputLayerSets—1, inclusive. The value of HighestTid shall be in the range of 0 to vps_max_sub_layers_minus1, inclusive. The variables TargetDecLayerSetIdx. TargetOptLayerIdList, and TargetDecLayerIdList are then derived as specified by Equation 8-1. The output operation point under test has OptLayerIdList equal to TargetOptLayerIdList, OpLayerIdList equal to TargetDecLayerIdList, and OpTid equal to HighestTid.

. . .

For each output operation point under test when the bitstream-specific CPB operation is tested, the number of bitstream conformance tests to be performed is equal to $n0*n1*(n2*2+n3)*n4$, where the values of n0, n1, n2, n3, and n4 are specified as follows:

. . .

Modify subclause D.3.1 as follows:

It is a requirement of bitstream conformance that when a prefix SEI message with payloadType equal to 17 (progressive refinement segment end) or 22 (post-filter hint) is present in an access unit, a suffix SEI message with the same value of payloadType shall not be present in the same access unit access unit.

[[removed: Let prevVcINaIUnitInAu of an SEI NAL unit or an SEI message be the preceding VCL NAL unit in decoding order, if any, in the same access unit, and nextVcINaIUnitInAu of an SEI NAL unit or an SEI message be the next VCL NAL unit in decoding order, if any, in the same access unit.]]

It is a requirement of bitstream conformance that the following restrictions apply on containing of SEI messages in SEI NAL units:
   An SEI NAL unit containing an active parameter sets SEI message shall contain only one active parameter sets SEI message and shall not contain any other SET messages.
   [[removed: When an SEI NAL unit containing an active parameter sets SEI message is present in an access unit, it shall be the first SEI NAL unit that follows the prevVcINaIUnitInAu of the SEI NAL unit and precedes the nextVcINaIUnitInAu of the SEI NAL unit.]]
   When an SEI NAL unit contains a non-nested buffering period SEI message, a non-nested picture timing SEI message, or a non-nested decoding unit information SEI message, the SEI NAL unit shall not contain any other SEI message with payloadType not equal to 0 (buffering period), 1 (picture timing), or 130 (decoding unit information).
   When an SEI NAL unit contains a nested buffering period SEI message, a nested picture timing SEI message, or a nested decoding unit information SEI message, the SEI NAL unit shall not contain any other SEI message with payloadType not equal to 0 (buffering period), 1 (picture timing), 130 (decoding unit information), or 133 (scalable nesting).

Let prevVcINaIUnitInAu of an SEI NAL unit or an SEI message be the preceding VCL NAL unit in decoding order, if any, in the same access unit, and nextVcINaIUnitInAu of an SEI NAL unit or an SEI message be the next VCL NAL unit in decoding order, if any, in the same access unit. It is a requirement of bitstream conformance that the following restrictions apply;

It is a requirement of bitstream conformance that the following restrictions apply on order of SEI messages:
   When an SEI NAL unit containing an active parameter sets SEI message is present in an access unit, it shall be the first SEI NAL unit that follows the prevVcINaIUnitInAu of the SEI NAL unit and precedes the nextVcINaIUnitInAu of the SEI NAL unit.
   When a non-nested buffering period SEI message is present in an access unit, it shall not follow any other SEI message that follows the prevVcINaIUnitInAu of the buffering period SEI message and precedes the nextVcINaIUnitInAu of the buffering period SEI message, other than an active parameter sets SEI message.
   When a non-nested picture timing SEI message is present in an access unit, it shall not follow any other SEI message that follows the prevVcINaIUnitInAu of the picture timing SEI message and precedes the nextVcI- NalUnitInAu of the picture timing SEI message, other than an active parameter sets SEI message or a non-nested buffering period SEI message.

When a non-nested decoding unit information SEI message is present in an access unit, it shall not follow any other SEI message in the same access unit that follows the prevVcINalUnitInAu of the decoding unit information SEI message and precedes the nextVcINalUnitInAu of the decoding unit information SEI message, other than an active parameter sets SEI message, a non-nested buffering period SEI message, or a non-nested picture timing SEI message.

When a nested buffering period SEI message, a nested picture timing SEI message, or a nested decoding unit information SEI message is contained in a scalable nesting SEI message in an access unit, the scalable nesting SEI message shall not follow any other SEI message that follows the prevVcINalUnitInAu of the scalable nesting SEI message and precedes the nextVcINalUnitInAu of the scalable nesting SEI message, other than an active parameter sets SEI message, a non-nested buffering period SEI message, a non-nested picture timing SEI message, a non-nested decoding unit information SEI message, or another scalable nesting SET message that contains a buffering period SEI message, a picture timing SET message, or a decoding unit information SEI message.

When payloadType is equal to 0 (buffering period), 1 (picture timing), or 130 (decoding unit information) for an SEI message, nested or non-nested, within the access unit, the SEI NAL unit containing the SEI message shall precede all NAL units of any picture unit that has nuh_layer_id greater than highestAppLayerId, where highestAppLayerId is the greatest value of nuh_layer_id of all the layers in all the operation points that the SEI message applies to.

When payloadType is equal to 2, 3, 6, 9, 15, 16, 17, 19, 22, 23, 45, 47, 128, 131, 132, or 134 (i.e. one of the SEI messages that have payloadType not equal to any of 0, 1, 4, 5, 130, and 133) for an SEI message, nested or non-nested, within the access unit, the SEI NAL unit containing the SEI message shall precede all NAL units of any picture unit that has nuh_layer_id greater than highestAppLayerId, where highestAppLayerId is the greatest value of nuh_layer_id of all the layers that the SEI message applies.

[[Removed: For a non-nested SEI message, depending on the value of payloadType, t]]
The following applies on the applicable operation points or layers of SEI messages:

For a non-nested SEI message, when [[removed: If]] payloadType is equal to 0 (buffering period), 1 (picture timing), or 130 (decoding unit information), the non-nested SEI message applies to the operation point that has OpTid equal to the greatest value of nuh_temporal_id_plus1 among all VCL NAL units in the bitstream, and that has OpLayerIdList containing all values of nuh_layer_id in all VCL units in the bitstream.

For a non-nested SEI message, [[removed: Otherwise,]] when payloadType is equal to 2, 3, 6, 9, 15, 16, 17, 19, 22, 23, 45, 47, 128, 131, 132, or 134 (i.e. one of the SEI messages that have payloadType not equal to any of 0, 1, 4, 5, [[removed: or]] 130, and 133 [[removed: and that are allowed to be nested SEI messages]]), the non-nested SEI message applies to the layer for which the VCL NAL units have nuh_layer_id equal to the nuh_layer_id of the SEI NAL unit containing the SEI message.

An active parameter sets SEI message, which cannot be nested, applies to all layers in the bitstream.

When frame_field_info_present_flag is equal to 1 for a picture timing information SEI message, nested or non-nested, the frame field information carried in the syntax elements pic_struct, source_scan_type, and duplicate_flag applies to all the layers in all the operation points that the picture timing SEI message applies to.

It is a requirement of bitstream conformance that the following restrictions apply on nesting of SEI messages:

An SEI message that has payloadType equal to 129 (active parameter sets), 132 (decoded picture hash), and 133 (scalable nesting[[removed:)] SEI message]] shall not be nested in a scalable nesting SEI message.

When a scalable nesting SEI message contains a buffering period SEI message, a picture timing SEI message, or a decoding unit information SEI message, the scalable nesting SEI message shall not contain any other SEI message with payloadType not equal to 0 (buffering period), 1 (picture timing), or 130 (decoding unit information).

When a scalable nesting SEI message contains a buffering period SEI message, a picture timing SEI message, or a decoding unit information SEI message, the value of bitstream_subset_flag of the scalable nesting SEI message shall be equal to 1.

When a scalable nesting SEI message contains an SEI message that has payloadType equal to 2, 3, 6, 9, 15, 16, 17, 19, 22, 23, 45, 47, 128, 131, 132, or 134 (i.e. one of the SEI messages that have payloadType not equal to any of 0, 1, 4, 5, 130, and 133), the value of bitstream_subset_flag of the scalable nesting SEI message shall be equal to 0.

It is a requirement of bitstream conformance that the following restrictions apply on the values of nuh_layer_id and TemporalId of SEI NAL units:

When a non-nested SEI message has payloadType equal to 2, 3, 6, 9, 15, 16, 17, 19, 22, 23, 45, 47, 128, 131, 132, or 134 (i.e. one of the SEI messages that have payloadType not equal to any of 0, 1, 4, 5, 129, [[removed: or]] 130, and 133 [[removed: that are allowed to be nested SEI messages]]), the SEI NAL unit containing the non-nested SEI message shall have TemporalId equal to the TemporalId of the access unit containing the SEI NAL unit.

When a non-nested SEI message has payloadType equal to 0, 1, 129, or 130, the SEI NAL unit containing the non-nested SEI message shall have nuh_layer_id equal to 0.

When a non-nested SEI message has payloadType equal to 2, 3, 6, 9, 15, 16, 17, 19, 22, 23, 45, 47, 128, 131, 132, or 134 (i.e. one of the SEI messages that have payloadType not equal to any of 0, 1, 129, 130, and 133), the SEI NAL unit containing the non-nested SEI message shall have nuh_layer_id equal to the nuh_layer_id of the SEI NAL unit's associated VCL NAL unit.

NOTE 4—For an SEI NAL unit containing a scalable nesting SEI message, the values of TemporalId and nuh_layer_id should be set equal to the lowest value of TemporalId and nuh_layer_id, respectively, of all the sub-layers or operation points the nested SEI messages apply to.

It is a requirement of bitstream conformance that the following restrictions apply on the presence of SEI messages between two VCL NAL units of [[removed: an access unit]] picture:
  When there is a prefix SEI message that has payloadType equal to 0, 1, 2, 3, 6, 9, 15, 16, 17, 19, 22, 23, 45, 47, 128, 129, or 131 (i.e. one of the prefix SEI messages that are not user data registered by Rec. ITU-T T.35 SEI message, user data unregistered SEI message, decoding unit information SEI message, scalable nesting SEI message, or region refresh information SEI message) and applies to a picture of a layer layerA present between two VCL NAL units of the [[removed: an access unit]] picture in decoding order, there shall be a prefix SEI message that is of the same type and applies to the layer layerA present in the same access unit preceding the first VCL NAL unit of the [[removed: access unit]] picture.
  When there is a suffix SEI message that has payloadType equal to 3 (filler payload), 17 (progressive refinement segment end), 22 (post filter hint), or 132 (decoded picture hash) and applies to a picture of a layer layerA present between two VCL NAL units of [[removed: an access unit]] the picture in decoding order, there shall be a suffix SEI message that is of the same type and applies to the layer layerA resent in the same access unit succeeding the last VCL NAL unit of the [[removed: access unit]] picture.
It is a requirement of bitstream conformance that the following restrictions apply on repetition of SEI messages:
  For each of the following payloadType values, there shall be less than or equal to 8 identical sei_payload( ) syntax structures within [[removed: an access unit]] a picture unit: 0, 1, 2, 6, 9, 15, 16, 17, 19, 22, 23, 45, 47, 128, 129, 131, 132, and 133.
  There shall be less than or equal to 8 identical sei_payload( ) syntax structures with payloadType equal to 130 within a decoding unit.
  The number of identical sei_payload( ) syntax structures with payloadType equal to 134 in [[removed: an access unit]] a picture unit shall be less than or equal to the number of slice segments in the [[removed: access unit]] picture unit.
Modify subclause D.3.23 as follows:
The scalable nesting SEI message provides a mechanism to associate SEI messages with bitstream subsets corresponding to various operation points or with specific layers or sub-layers.
A scalable nesting SEI message contains one or more SEI messages.
bitstream_subset_flag equal to 0 specifies that the SEI messages contained in the scalable nesting SEI message apply to specific layers or sub-layers.
bitstream_subset_flag equal to 1 specifies that the SEI messages contained in the scalable nesting SEI message apply to one or more sub-bitstreams resulting from a sub-bitstream extraction process as specified in clause 10 with inputs based on the syntax elements of the scalable nesting SEI message as specified below.
[[removed: When a buffering period SEI message, a picture timing SEI message, or a decoding unit information SEI message is contained in the scalable nesting SEI message, bitstream_subset_flag shall be equal to 1.]]
Depending on the value ofbitstream_subset_flag, the layers or sub-layers, or the operation points to which the SEI messages contained in the scalable nesting SEI message apply are specified by deriving the lists nestingLayedIdList[i] and the variables maxTemporalId[i] based on syntax element values as specified below.
nesting_op_flag equal to 0 specifies that the list nestingLayerIdList[0] is specified by all_layers_flag and, when present, nesting_layer_id[i] for all i values in the range of 0 to nesting_num_layers_minus1, inclusive, and that the variable maxTemporalId[0] is specified by nesting_no_op_max_temporal_id_plus1, nesting_op_flag equal to 1 specifies that the list nestingLayerIdList[i] and the variable maxTemporalId[i] are specified by nesting_num_ops_minus1, default_op_flag, nesting_max_temporal_id_plus1[i], when present, and nesting_op_idx[i], when present.
default_op_flag equal to 1 specifies that maxTemporalId[0] is equal to nuh_temporal_id_plus1 of the current SEI NAL unit minus1 and that nestingLayerIdList[0] contains all integer values in the range of 0 to nuh_layer_id of the current SEI NAL unit, inclusive, in increasing order of the values.
When bitstream_subset_flag is equal to 1 and none of the layer sets specified by the VPS includes and only includes the layers having nuh_layer_id values in the range of 0 to nuh_layer_id of the current SEI NAL unit, inclusive, the value of default_op_flag shall be equal to 0.
nesting_num_ops_minus1 plus 1 minus default_op_flag specifies the number of the following nesting_op_idx[i] syntax elements. The value of nesting_num_ops_minus1 shall be in the range of 0 to 1023, inclusive.
If nesting_op_flag is equal to 0, the variable nestingNumOps is set equal to 1. Otherwise, the variable nestingNumOps is set equal to nesting_num_ops_minus1+1.
nesting_max_temporal_id_plus1[i] is used to specify the variable maxTemporalId[i]. The value of nesting_max_temporal_id_plus1[i] shall be greater than or equal to nuh_temporal_id_plus1 of the current SEI NAL unit. The variable maxTemporalId[i] is set equal to nesting_max_temporal_id_plus1[i]−1.
nesting_op_idx[i] is used to specify the list nestingLayerIdList[i]. The value of nesting_op_idx[i] shall be in the range of 0 to 1023, inclusive.
The list nestingLayerIdList[i] is set equal to the OpLayerIdList of the nesting_op_idx[i]-th layer set specified by the active VPS.
all_layers_flag equal to 0 specifies that the list nestingLayerIdList[0] is specified by nesting_layer_id[i] for all i values in the range of 0 to nesting_num_layers_minus1, inclusive, all_layers_flag equal to 1 specifies that the list nestingLayerIdList[0] consists of all values of nuh_layer_id present in the current access unit that are greater than or equal to nuh_layer_id of the current SEI NAL unit, in increasing order of the values.
Note: When nuh_layer_id of the SEI NAL unit containing the scalable nesting SEI message is greater than 0, bitstream_ subset_flag and all_layers_flag cannot both be equal to 1, because in this case the applicable operation point of the nested SEI messages would not include the base layer and consequently the sub-bitstream corresponding to the applicable operation point would be a non-conforming bitstream.
When nesting_op_flag is equal to 0 and all_layers_flag is equal 1, maxTemporalId[0] is set equal to 6.
nesting_no_op_max_temporal_id_plus1 minus 1 specifies the value of maxTemporalId[0] when nesting_op_flag is equal to 0 and all_layers_flag is equal to 0. The value of nesting_no_op_maxtemporal_id_plus1 shall not be equal to 0.

nesting_num_layers_minus1 plus 1 specifies the number of the following nesting_layer_id[i] syntax elements. The value of nesting_num_layers_minus1 shall be in the range of 0 to 63, inclusive.

nesting_layer_id[i] specifies the i-th nuh_layer_id value included in the list nestingLayerIdList[0].

For any i and j in the range of 0 to nesting_num_layers_minus1, inclusive, with i less than j, nesting_layer_id[i] shall be less than nesting_layer_id[j].

The list nestingLayerIdList[0] is set to consist of nesting_layer_id[i] for all i values in the range of 0 to nesting_num_layers_minus1, inclusive, in increasing order of i values.

When bitstream_subset_flag is equal to 0, the following applies:

The SEI messages contained in the scalable nesting SEI message apply to the sets of layers or sub-layers subLayerSet[i] for all i values in the range of 0 to nestingNumOps−1, inclusive, where the VCL NAL units of the layers or sub-layers in each set subLayerSet[i] have nuh_layer_id values that are included in the list nestingLayerIdList[i] and TemporalId values that are in the range of the TemporalId of the current SEI NAL unit to maxTemporalId[i], inclusive.

When a nested SEI message has payloadType equal to 2, 3, 6, 9, 15, 16, 17, 19, 22, 23, 45, 47, 128, 131, 132, or 134 (i.e. one of the SEI messages that have payloadType not equal to any of 0, 1, 4, 5, 130, and 133), the nuh_layer_id of the SEI NAL unit containing the scalable nesting SEI message shall have TemporalId equal to 0 and maxTemporalId[i] for all i shall be equal to 6.

When a nested SEI message has payloadType equal to 2, 3, 6, 9, 15, 16, 17, 19, 22, 23, 45, 47, 128, 131, 132, or 134 (i.e. one of the SEI messages that have payloadType not equal to any of 0, 1, 4, 5, 130, and 133) and the value of nestingNumOps is greater than 0, the nested SEI message applies to all layers for which each nuh_layer_id is included in at least one of the lists nestingLayerIdList[i] with i ranging from 0 to nestingNumOps−1, inclusive.

When bitstream_subset_flag is equal to 1, the SEI messages contained in the scalable nesting SEI message apply to the operation points corresponding to the sub-bitstreams subBitstream[i] for all i values in the range of 0 to nestingNumOps−1, inclusive, where each sub-bitstream subBitstream[i] is the output of the sub-bitstream extraction process of clause 10 with the bitstream, maxTemporalId[i], and nestingLayerIdList[i] as inputs.

When bitstream_subset_flag is equal to 1 and nesting_op_flag is equal to 0, nestingLayeridList[0] shall include and only include the nuh_layer_id values of one of the layer sets snecified by the VPS.

nesting_zero_bit shall be equal to 0.

F.3 Definitions

For the purpose of this annex, the following definitions apply in addition to the definitions in clause 3. These definitions are either not present in clause 3 or replace definitions in clause 3.

[[removed:

F.3.1 access unit: A set of NAL units that are associated with each other according to a specified classification rule, are consecutive in decoding order, and contain the VCL NAL units of all coded pictures associated with the same output time and their associated non-VCL NAL units.

F.3.2 NOTE 1—Pictures in the same access unit are associated with the same picture order count.]]

F3.1 alternative output layer: A layer that is a direct reference layer or an indirect reference layer of an output layer and which may include a picture that may be output when no picture of the output layer is present in the access unit containing the picture.

F.7.4.3.1 Video Parameter Set RBSP Semantics

The specifications in subclause 7.4.3.1 apply with following modifications and additions:

layerSetLayerIdList is replaced by LayerSetLayerIdList.
  numLayersInIdList is replaced by NumLayersInIdList.
  Replace "Each operation point is identified by the associated layer identifier list, denoted as OpLayerIdList, which consists of the list of nuh_layer_id values of all NAL units included in the operation point, in increasing order of nuh_layer_id values, and a variable OpTid, which is equal to the highest TemporalId of all NAL units included in the operation point." with "Each operation point is identified by the associated layer identifier list, denoted as OpLayerIdList, which consists of the list of nuh_layer_id values of all NAL units included in the operation point, in increasing order of nuh_layer_id values, and a variable OpTid, which is equal to the highest TemporalId of all NAL units included in the operation point. Each output operation point is associated with an operation point and identified by the a list of nuh_layer_id values of all the pictures that are to be output, in increasing order of nuh_layer_id values, denoted as OptLayerIdList, and the [[removed: a variable]] OpTid of the associated operation point. The OpLayerIdList of the operation point associated with an output operation point is also referred to as the OpLayerIdList of the output operation point [[removed:, which is equal to the highest TemporalId of all NAL units included in the operation point. The layer identifier list associated with the list OptLayerIdList, denoted as OpLayerIdList, consists of the list of nuh_layer_id values of all NAL units included in the operation point, in increasing order of nuh_layer_id values.".]]

Figure 2:
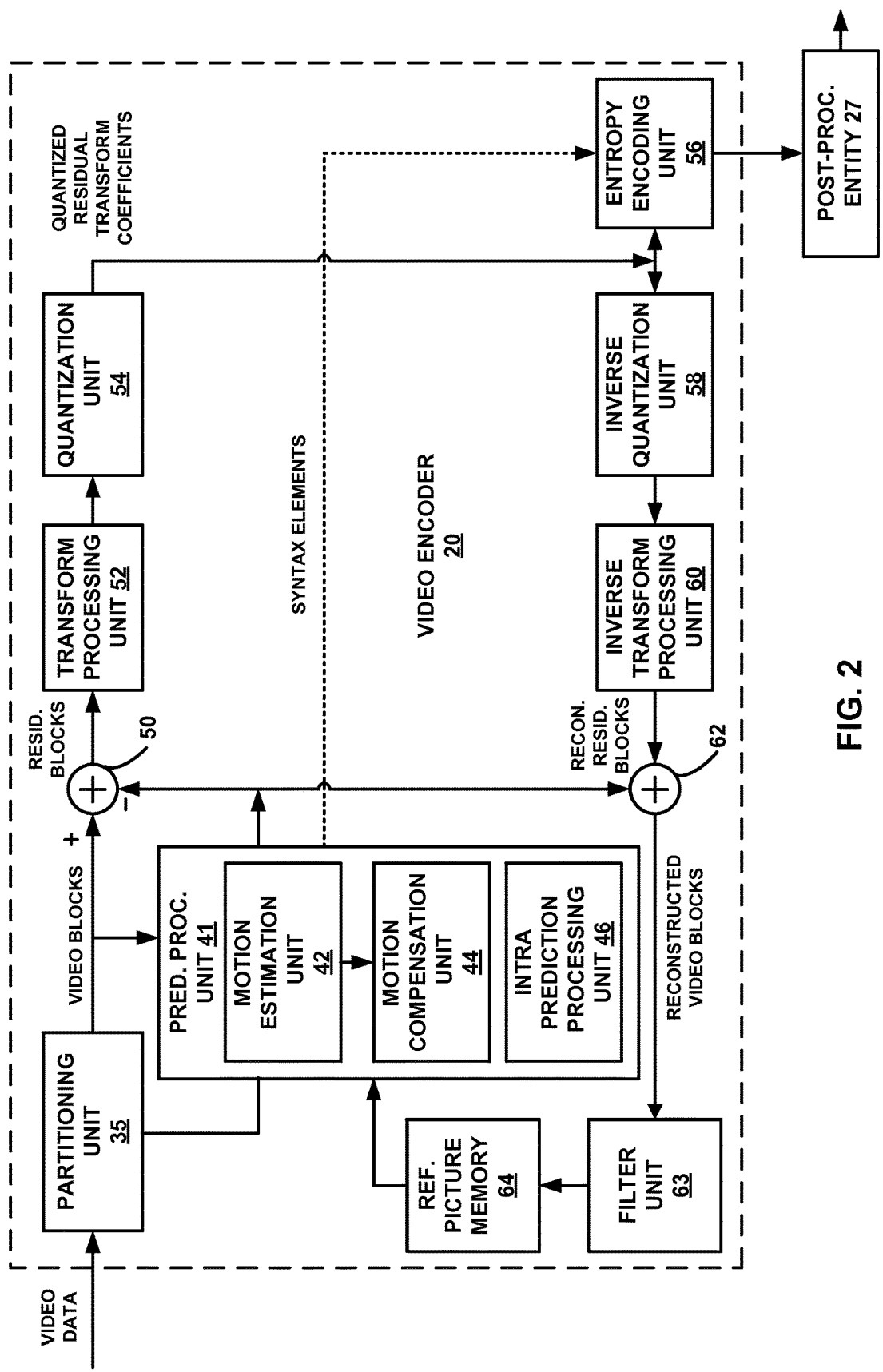
FIG. 2 is a block diagram illustrating an example video encoder that may implement the techniques described in this disclosure.

FIG. 2 is a block diagram illustrating an example video encoder 20 that may implement the techniques described in this disclosure. FIG. 2 is provided for purposes of explanation and should not be considered limiting of the techniques as broadly exemplified and described in this disclosure. For purposes of explanation, this disclosure describes video encoder 20 in the context of HEVC coding. However, the techniques of this disclosure may be applicable to other coding standards or methods Video encoder 20 may be configured to output video to post-processing entity 27, which is another example device that may implement the techniques described in this disclosure. Post-processing entity 27 is intended to represent an example of a video entity, such as a media aware network element (MANE), a splicing/editing device or another intermediate device that may process encoded video data from video encoder 20. In some instances, post-processing entity 27 may be an example of a network entity. In some video encoding systems, post-processing entity 27 and video encoder 20 may be parts of separate devices, while in other instances, the functionality described with respect to post-processing entity 27 may be performed by the same device that comprises video encoder 20.

Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 2, video encoder 20 includes a partitioning unit 35, prediction processing unit 41, filter unit 63, reference picture memory 64, summer 50, transform processing unit 52, quantization unit 54, and entropy encoding unit 56. Prediction processing unit 41 includes motion estimation unit 42, motion compensation unit 44, and intra-prediction processing unit 46. For video block reconstruction, video encoder 20 also includes inverse quantization unit 58, inverse transform processing unit 60, and summer 62. Filter unit 63 is intended to represent one or more loop filters such as a deblocking filter, an adaptive loop filter (ALF), and a sample adaptive offset (SAO) filter. Although filter unit 63 is shown in FIG. 2 as being an in loop filter, in other configurations, filter unit 63 may be implemented as a post loop filter.

As shown in FIG. 2, video encoder 20 receives video data, and partitioning unit 35 partitions the data into video blocks. This partitioning may also include partitioning into slices, tiles, or other larger units, as wells as video block partitioning, e.g., according to a quadtree structure of LCUs and CUs. Video encoder 20 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra coding modes or one of a plurality of inter coding modes, for the current video block based on error results (e.g., coding rate and the level of distortion). Prediction processing unit 41 may provide the resulting intra- or inter-coded block to summer 50 to generate residual block data and to summer 62 to reconstruct the encoded block for use as a reference picture.

Intra-prediction processing unit 46 within prediction processing unit 41 may perform intra-predictive coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices or B slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by video decoder 30 in decoding the video blocks of the video slice.

Intra-prediction processing unit 46 may intra-predict a current block, as an alternative to the inter-prediction performed by motion estimation unit 42 and motion compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction processing unit 46 (or mode select unit 40, in some examples) may select an appropriate intra-prediction mode to use from the tested modes. For example, intra-prediction processing unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 46 may calculate ratios from the distortions and rates for the various encoded blocks to determine which intra-prediction mode exhibits the best rate-distortion value for the block.

In any case, after selecting an intra-prediction mode for a block. Intra-prediction processing unit 46 may provide information indicative of the selected intra-prediction mode for the block to entropy encoding unit 56. Entropy encoding unit 56 may encode the information indicating the selected intra-prediction mode in accordance with the techniques of this disclosure. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

After prediction processing unit 41 generates the predictive block for the current video block via either inter-prediction or intra-prediction, video encoder 20 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 56, the encoded bitstream may be transmitted to video decoder 30, or archived for later transmission or retrieval by video decoder 30. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within one of the reference picture lists. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in reference picture memory 64. The reference block may be used by motion estimation unit 42 and motion compensation unit 44 as a reference block to inter-predict a block in a subsequent video frame or picture.

According to aspects of this disclosure, video encoder 20 may be configured to generate a number of syntax elements, such as the syntax elements associated with SEI messages described above, including SEI messages for multi-layer codecs. For example, video encoder 20 may be configured to generate syntax elements according to any combination of the fifteen aspects described above with respect to FIG. 1. In some instances, video encoder 20 may encode such syntax elements using entropy encoding unit 56 or another unit responsible for encoding data and generating an encoded bitstream. Furthermore, post-processing entity 27 of FIG. 2 is another example device that may implement the techniques described in this disclosure with respect to SEI messages, including SEI messages for multi-layer codecs.

Figure 3:
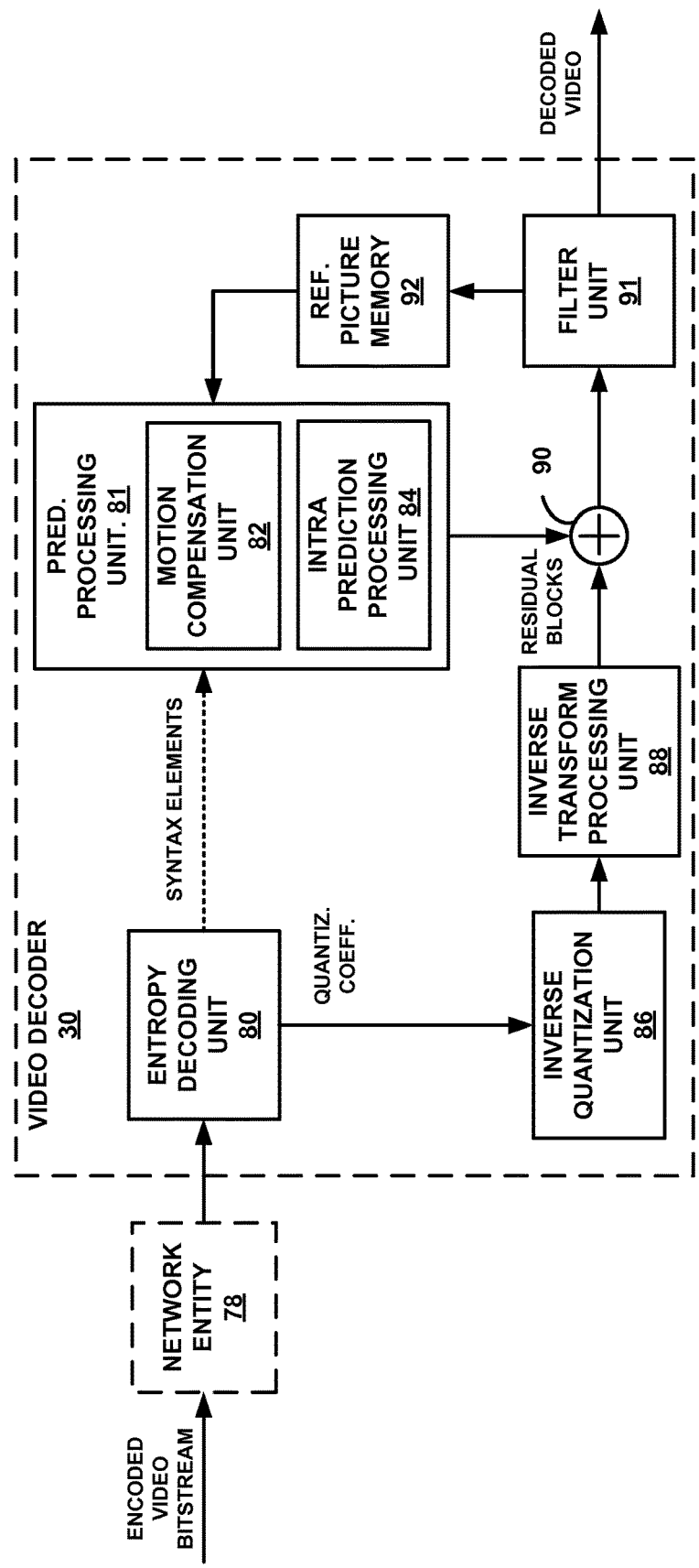
FIG. 3 is a block diagram illustrating an example video decoder that may implement the techniques described in this disclosure.

FIG. 3 is a block diagram illustrating an example video decoder 30 that may implement the techniques described in this disclosure. FIG. 3 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

In the example of FIG. 3, video decoder 30 includes an entropy decoding unit 80, prediction processing unit 81, inverse quantization unit 86, inverse transformation processing unit 88, summer 90, filter unit 91, and reference picture memory 92. Prediction processing unit 81 includes motion compensation unit 82 and intra-prediction processing unit 84. Video decoder 30 may, in some examples, perform a decoding pass generally reciprocal to the encoding pass described with respect to video encoder 20 from FIG. 2.

During the decoding process, video decoder 30 receives an encoded video bitstream that represents video blocks of an encoded video slice and associated syntax elements from video encoder 20. Video decoder 30 may receive the encoded video bitstream from network entity 78. Network entity 78 may, for example, be a server, a MANE, a video editor/splicer, or other such device configured to implement one or more of the techniques described above. Network entity 78 may or may not include a video encoder, such as video encoder 20. Some of the techniques described in this disclosure may be implemented by network entity 78 prior to network entity 78 transmitting the encoded video bitstream to video decoder 30. In some video decoding systems, network entity 78 and video decoder 30 may be parts of separate devices, while in other instances, the functionality described with respect to network entity 78 may be performed by the same device that comprises video decoder 30.

Entropy decoding unit 80 of video decoder 30 entropy decodes the bitstream to generate quantized coefficients, motion vectors, and other syntax elements. Entropy decoding unit 80 forwards the motion vectors and other syntax elements to prediction processing unit 81. Video decoder 30 may receive the syntax elements at the video slice level and/or the video block level.

When the video slice is coded as an intra-coded (I) slice, intra-prediction processing unit 84 of prediction processing unit 81 may generate prediction data for a video block of the current video slice based on a signaled intra prediction mode and data from previously decoded blocks of the current frame or picture. When the video frame is coded as an inter-coded (i.e., B or P) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within one of the reference picture lists. Video decoder 30 may construct the reference frame lists, List 0 and List 1, using default construction techniques based on reference pictures stored in reference picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 uses some of the received syntax elements to determine a prediction mode (e.g., intra- or inter-prediction) used to code the video blocks of the video slice, an inter-prediction slice type (e.g., B slice or P slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and use the interpolation filters to produce predictive blocks.

Inverse quantization unit 86 inverse quantizes, i.e., de-quantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied. Inverse transform processing unit 88 applies an inverse transform, e.g., an inverse DCT, an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, video decoder 30 forms a decoded video block by summing the residual blocks from inverse transform processing unit 88 with the corresponding predictive blocks generated by motion compensation unit 82. Summer 90 represents the component or components that perform this summation operation. If desired, loop filters (either in the coding loop or after the coding loop) may also be used to smooth pixel transitions, or otherwise improve the video quality.

Filter unit 91 is intended to represent one or more loop filters such as a deblocking filter, an adaptive loop filter (ALF), and a sample adaptive offset (SAO) filter. Although filter unit 91 is shown in FIG. 3 as being an in loop filter, in other configurations, filter unit 91 may be implemented as a post loop filter. The decoded video blocks in a given frame or picture are then stored in reference picture memory 92, which stores reference pictures used for subsequent motion compensation. Reference picture memory 92 also stores decoded video for later presentation on a display device, such as display device 31 of FIG. 1.

According to aspects of this disclosure, video decoder 30 may be configured to parse and decode a number of syntax elements, such as the syntax elements associated with SEI messages described above, including SEI messages for multi-layer codecs. For example, video decoder 30 may be configured to parse and decode syntax elements according to any combination of the fifteen aspects described above with respect to FIG. 1. In some instances, video decoder 30 may decode such syntax elements using entropy decoding unit 80 or another unit responsible for decoding data from an encoded bitstream. Furthermore, network entity 78 of FIG. 3 (which may be a media aware network element) is another example device that may implement the techniques described in this disclosure with respect to SEI messages, including SEI messages for multi-layer codecs.

Figure 4:
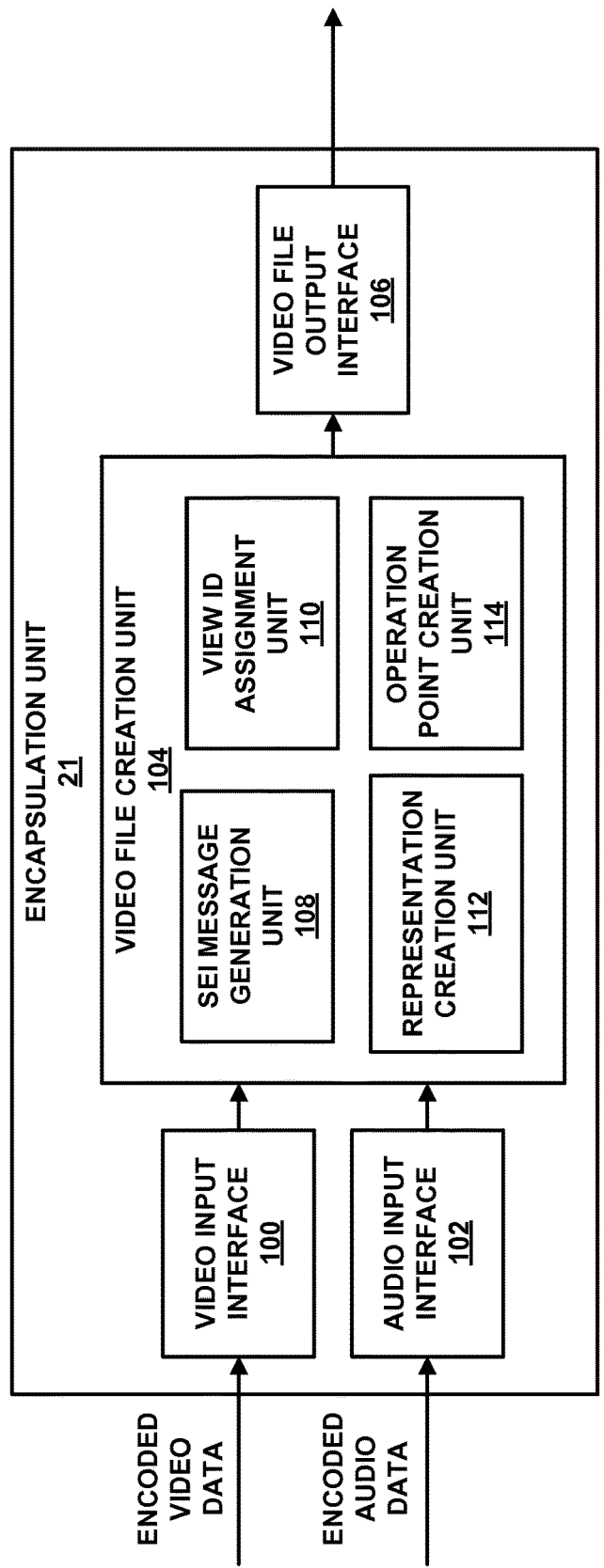
FIG. 4 is a block diagram illustrating one example of an encapsulation unit in which one or more aspects of this disclosure could be implemented.

FIG. 4 is a block diagram illustrating encapsulation unit 21 in more detail. In the example of FIG. 4, encapsulation unit 21 includes a video input interface 100, an audio input interface 102, a video file creation unit 104, and a video file output interface 106. Video file creation unit 104, in this example, includes a supplemental enhancement information (SEI) message generation unit 108, a view identifier (ID) assignment unit 110, a representation creation unit 112, and an operation point creation unit 114.

Video input interface 100 and audio input interface 102 receive encoded video and audio data, respectively. While not shown in the example of FIG. 1, source device 12 may also include an audio source and audio encoder to generate audio data and encode audio data, respectively. Encapsulation unit 21 may then encapsulate the encoded audio data and the encoded video data to form a video file. Video input interface 100 and audio input interface 102 may receive encoded video and audio data as the data is encoded, or may retrieve encoded video and audio data from a computer-readable medium. Upon receiving encoded video and audio data, video input interface 100 and audio input interface 102 pass the encoded video and audio data to video file creation unit 104 for assembly into a video file.

Video file creation unit 104 may correspond to a control unit including hardware, software, and/or firmware configured to perform the functions and procedures attributed thereto. The control unit may further perform the functions attributed to encapsulation unit 21 generally. For examples in which video file creation unit 104 is embodied in software and/or firmware, encapsulation unit 21 may include a computer-readable medium comprising instructions for video file creation unit 104 and a processing unit to execute the instructions. Each of the sub-units of video file creation unit 104 (SEI message generation unit 108, view ID assignment unit 110, representation creation unit 112, and operation point creation unit 114, in this example) may be implemented as individual hardware units and/or software modules, and may be functionally integrated or further separated into additional sub-units.

Video file creation unit 104 may correspond to any suitable processing unit or processing circuitry, such as, for example, one or more microprocessors, application-specific integrated circuits (ASICs), field programmable gate arrays (FPGAs), digital signal processors (DSPs), or any combination thereof. Video file creation unit 104 may further include a non-transitory computer-readable medium storing instructions for any or all of SEI message generation unit 108, view ID assignment unit 110, representation creation unit 112, and operation point creation unit 114, as well as a processor for executing the instructions.

In general, video file creation unit 104 may create one or more video files including the received audio and video data. Video file creation unit 104 may construct a media presentation description (MPD) for multimedia content including two or more views. In other examples, video file creation unit 104 may create a manifest storing data similar to that of the MPD for the multimedia content.

SEI message generation unit 108 may represent a unit that generates SEI messages. SEI message generation unit 108 may, in accordance with the techniques described in this disclosure, be configured to generate a number of syntax elements, such as the syntax elements associated with SEI messages described above, including SEI messages for multi-layer codecs. For example, SEI message generation unit 108 may be configured to generate syntax elements according to any combination of the fifteen aspects described above with respect to FIG. 1.

View ID assignment unit 110 may assign view identifiers to each of the views of the multimedia content. Representation creation unit 112 may construct one or more representations for the multimedia content, each of which may include one or more of the views for the multimedia content. In some examples, view ID assignment unit 110 may include data in the MPD and/or the representations (e.g., header data for the representations) indicating a maximum and a minimum of the view identifiers for views included in the representations. In addition, representation creation unit 112 may provide information in the MPD that indicates whether larger view IDs correspond to views having camera perspectives to the right or to the left of camera perspectives for views having smaller view IDs.

In some examples, the same layer may be encoded using various encoding characteristics, such as different frame rates, different bit rates, different encoding schemes, or other differences. Representation creation unit 112 may ensure that each layer included in a common representation is encoded according to the same encoding characteristics. In this manner, the MPD and/or header data for the representation may signal a set of characteristics (or attributes) for the representation that applies to all layers in the representation. Moreover, representation creation unit 112 may create multiple representations including the same layers, albeit with potentially different encoding characteristics. In some examples, representation creation unit 112 may encapsulate each layer of multimedia content in individual representations. In such examples, to output more than one layer, destination device 14 may request two or more representations of the multimedia content.

Operation point creation unit 114 may create operation points for one or more representations of the multimedia content. In general, an operation point corresponds to a subset of views in a representation that are targeted for output, where each of the views shares a common temporal level. As one example an operation point may be identified by a temporal_id value representing the target temporal level and a set of view_id values representing the target output views. One operation point may be associated with a bitstream subset, which consists of the target output views and all other views on which the target output views depend.

Video file output interface 106 may output the created video file. For example, video file output interface 106 may be configured to provide the created video file to output interface 22, as described above with respect to FIG. 1.

While the techniques of FIG. 4 are described with encapsulation unit 21 for purposes of example, it should be understood that similar techniques may be performed by other video processing units, such as decapsulation unit 29 (FIG. 1), video encoder 20, or video decoder 30. For example, decapsulation unit 29 may be configured to receive a multi-layer bitstream and parse/decode the above-noted syntax from the multi-layer bitstream.

Figure 5:
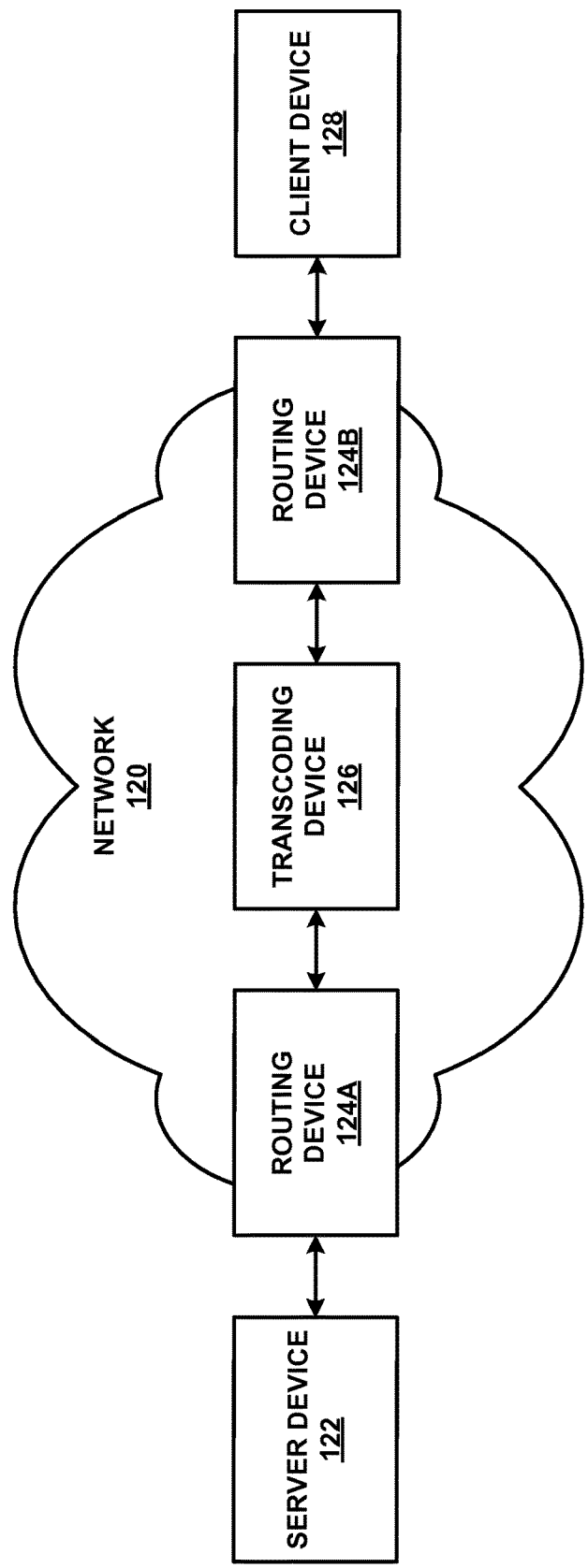
FIG. 5 is a block diagram illustrating one example network in which one or more aspects of this disclosure could be implemented.

FIG. 5 is a block diagram illustrating an example set of devices that form part of network 120. In this example, network 120 includes routing devices 124A, 124B (routing devices 124) and transcoding device 126. Routing devices 124 and transcoding device 126 are intended to represent a small number of devices that may form part of network 120. Other network devices, such as switches, hubs, gateways, firewalls, bridges, and other such devices may also be included within network 120. Moreover, additional network devices may be provided along a network path between server device 122 and client device 128. Server device 122 may correspond to source device 12 (FIG. 1), while client device 128 may correspond to destination device 14 (FIG. 1), in some examples.

In general, routing devices 124 implement one or more routing protocols to exchange network data through network 120. In some examples, routing devices 124 may be configured to perform proxy or cache operations. Therefore, in some examples, routing devices 124 may be referred to as proxy devices. In general, routing devices 124 execute routing protocols to discover routes through network 120. By executing such routing protocols, routing device 124B may discover a network route from itself to server device 122 via routing device 124A. One or more of routing devices 124 may comprise a MANE that uses one or more aspects of this disclosure.

The techniques of this disclosure may be implemented by network devices such as routing devices 124 and transcoding device 126, but also may be implemented by client device 128. In this manner, routing devices 124, transcoding device 126, and client device 128 represent examples of devices configured to perform the techniques of this disclosure. Moreover, the devices of FIG. 1, and encoder 20 illustrated in FIG. 2 and decoder 30 illustrated in FIG. 3, are also exemplary devices that can be configured to perform the techniques of this disclosure.

Figure 6:
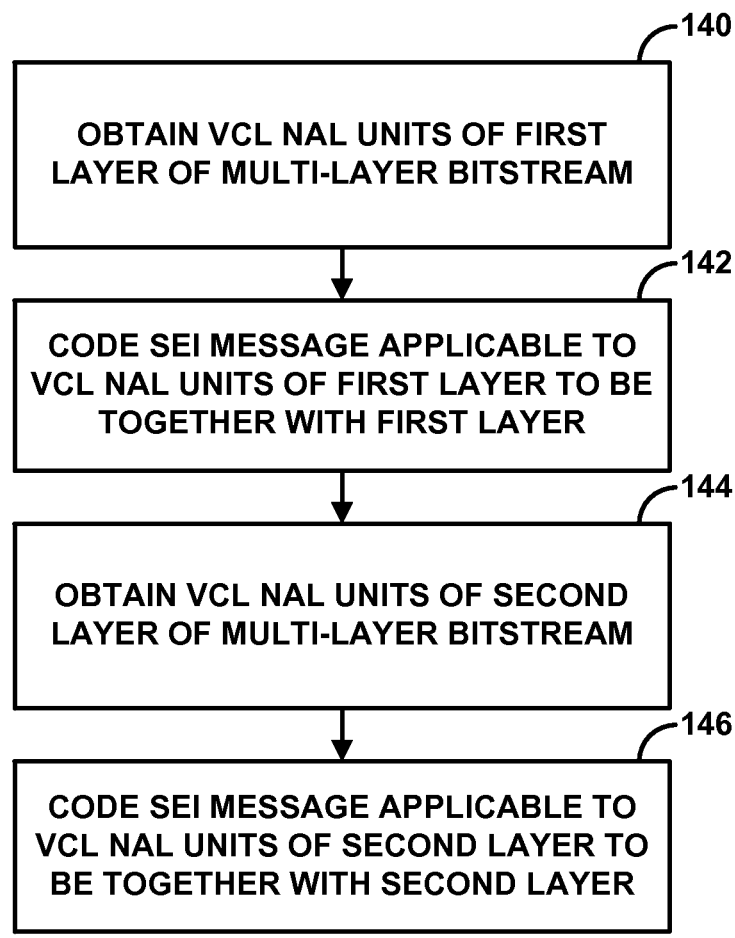
FIG. 6 is a flow diagram illustrating an example operation of a video processing device configured to code an SEI message in accordance with various aspects of the techniques described in this disclosure.

FIG. 6 is a flow diagram illustrating an example operation of a video processing device configured to code an SEI message in accordance with various aspects of the techniques described in this disclosure. In the example of FIG. 6, a video processing device, such as video encoder 20, encapsulation unit 21, decapsulation unit 29, post-processing entity 27, network entity 78, obtains one or more VCL NAL units of a first layer of a multi-layer bitstream (140). For example, in instances in which the video processing device is a video encoder or a video decoder, the video processing device may encode the VCL NAL units in a multi-layer bitstream or decode the VCL NAL units from a multi-layer bitstream. In examples in which the video processing device is not configured to encode or decode such VCL NAL units, the video processing device may parse and obtain the VCL NAL units from a multi-layer bitstream.

The video processing device also codes (e.g., encodes or decodes) an SEI message that is applicable to the VCL NAL units of the first layer to be together with the first layer in the multi-layer bitstream (142). For example, according to aspects of this disclosure, the video processing device only codes the non-VCL NAL units containing the SEI message applicable to the VCL NAL units of the first layer together with the VCL NAL units of the first layer, and does not include the SEI message with other layers of the multi-layer bitstream. For example, according to aspects of this disclosure, the multi-layer bitstream does not contain any coded pictures of any other layer of the multi-layer bitstream between the VCL NAL units of the first layer and the non-VCL NAL units containing the SEI message applicable to the VCL NAL units of the first layer. In this manner, the SEI message remains together with the layer to which the SEI message applies for access units having multiple layer components. In some examples, the video processing device may code the SEI message to be directly adjacent to the VCL NAL units to which the message applies in the multi-layer bitstream.

In some examples, the VCL NAL units of the first layer are VCL NAL units of a first picture of the first layer and the SEI message is a prefix SEI message applicable to the first picture of the first layer. In such examples, only coding the non-VCL NAL units containing the prefix SEI message together with the VCL NAL units may include only coding the non-VCL NAL units preceding the VCL NAL units in the bitstream. That is, the video processing device may code the non-VCL NAL units containing the SEI message to be located immediately prior to the VCL NAL units of the first picture in the multi-layer bitstream.

In some examples, the VCL NAL units of the first layer are VCL NAL units of a first picture of the first layer and the SEI message is a suffix SEI message applicable to the first picture of the first layer. In such examples, only coding the non-VCL NAL units containing the suffix SEI message together with the VCL NAL units may include only coding the non-VCL NAL units subsequent to the VCL NAL units in the bitstream. That is, the video processing device may code the non-VCL NAL units containing the SEI message to be located immediately following the VCL NAL units of the first picture in the multi-layer bitstream.

In the example of FIG. 6, the video processing device also obtains VCL NAL units of a second layer of the multi-layer bitstream (144). For example, the video processing device may code (i.e., encode or decode) slices of a picture of a second layer of the multi-layer bitstream. The video processing device also codes an SEI message that is applicable to the VCL NAL units of the second layer to be together with the VCL NAL units of the second layer (146). For example, as described above, the video processing device may code the multi-layer bitstream such that the bitstream does not contain any coded pictures of any other layer of the multi-layer bitstream between the VCL NAL units of the second layer and the non-VCL NAL units containing the SEI message applicable to the VCL NAL units of the second layer. In this manner, the SEI message remains together with the layer to which the SEI message applies for access units having multiple layer components.

Again, in some examples, the video processing device may code one or more non-VCL NAL units containing a second prefix SEI message applicable to VCL NAL units of the second picture following the first picture in the bitstream. The video processing device may also code one or more non-VCL NAL units containing a second suffix SEI message applicable to VCL NAL units of the second picture following the second picture in the bitstream.

In some instances, the video processing device may also determine a maximum repetition parameter for the SEI message based on a picture unit that contains VCL NAL units of a first picture of the first layer and associated non-VCL NAL units of the first picture.

It should also be understood that the steps shown and described with respect to FIG. 6 are provided as merely one example. That is, the steps shown in the example of FIG. 6 need not necessarily be performed in the order shown in FIG. 6, and fewer, additional, or alternative steps may be performed. Moreover, while the techniques are generically described above with respect to a video processing device, the techniques may be implemented by a variety of video processing devices, such as video encoder 20, encapsulation unit 21, decapsulation unit 29, post-processing entity 27, network entity 78, or other processing units.

Figure 7:
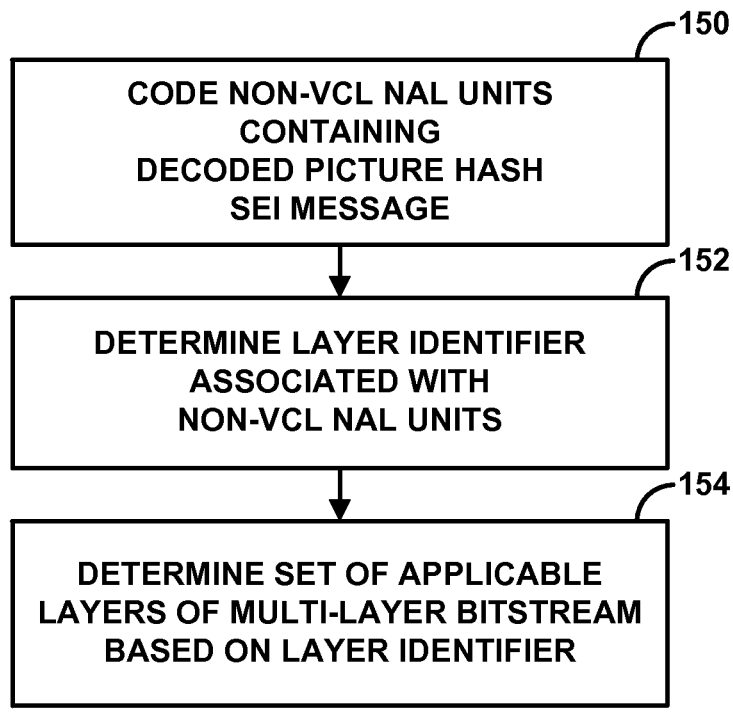
FIG. 7 is a flow diagram illustrating another example operation of a video processing device configured to code an SEI message in accordance with various aspects of the techniques described in this disclosure.

FIG. 7 is a flow diagram illustrating another example operation of a video processing device configured to code an SEI message in accordance with various aspects of the techniques described in this disclosure. In the example of FIG. 7, a video processing device, such as video encoder 20, encapsulation unit 21, decapsulation unit 29, post-processing entity 27, network entity 78, codes one or more non-VCL NAL units of a layer of a multi-layer bitstream that contain a decoded picture hash SEI message (150). As noted above, a decoded picture hash message may provide a checksum derived from the sample values of a decoded picture. The decoded picture hash message may be used, e.g., by a video decoder such as video decoder 30, for detecting whether a picture was correctly received and decoded.

The video processing device also determines a layer identifier associated with the non-VCL NAL units (152). The video processing device also determines a set of layers of the multi-layer bitstream to which the decoded picture hash SEI message is applicable based on a layer identifier of the non-VCL NAL units containing the decoded picture hash SEI message (154). According to aspects of this disclosure, the set of applicable layers of a decoded picture hash SEI message may be specified to be the layer with the layer identifier (nuh_layer_id) that is equal to the layer identifier (nuh_layer_id) of the SEI NAL unit containing the SEI message. That is, the decoded picture hash SEI message only applies to the layer that has the same layer identifier (nuh_layer_id) of the SEI NAL unit that contains the SEI message. In some instances, the decoded picture hash SEI message may only be a non-nested SEI message.

In some examples, additionally or alternatively, the video processing device may also code one or more second non-VCL NAL units of the multi-layer bitstream. The second non-VCL NAL units may contain an active parameter sets SEI message that indicates the parameter sets that are active for a particular portion of video data. The video processing device may also determine that the active parameter sets SEI message is applicable to all layers of the multi-layer bitstream based on the one or more second non-VCL NAL units containing the active parameter set SEI message. That is, the video processing device may determine that the active parameter sets SEI message is applicable to all layers of the multi-layer bitstream by virtue of the SEI message being an active parameter sets SEI message. In some examples, the video processing device may further code one or more syntax elements indicating that the active parameter sets SEI message is applicable to all layers of the multi-layer bitstream. In some examples, the video processing device may only code the active parameter sets SEI message as a non-nested SEI message.

In some examples, additionally or alternatively, the video processing device may code one or more syntax elements indicating that frame field information is present in a picture timing SEI message of the multi-layer bitstream. The video processing device may also apply the frame field information to all layers in all operation points of the multi-layer bitstream to which the picture timing SEI message applies.

It should also be understood that the steps shown and described with respect to FIG. 7 are provided as merely one example. That is, the steps shown in the example of FIG. 7 need not necessarily be performed in the order shown in FIG. 7, and fewer, additional, or alternative steps may be performed. Moreover, while the techniques are generically described above with respect to a video processing device, the techniques may be implemented by a variety of video processing devices, such as video encoder 20, encapsulation unit 21, decapsulation unit 29, post-processing entity 27, network entity 78, or other processing units.

Figure 8:
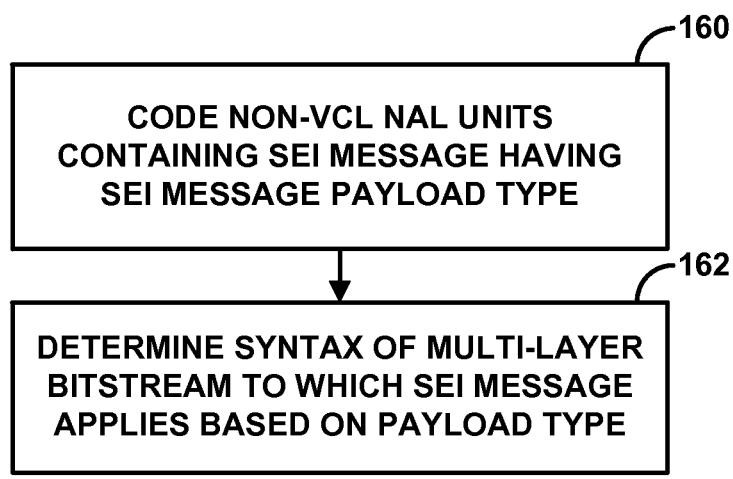
FIG. 8 is a flow diagram illustrating another example operation of a video processing device configured to code an SEI message in accordance with various aspects of the techniques described in this disclosure.

FIG. 8 is a flow diagram illustrating another example operation of a video processing device configured to code an SEI message in accordance with various aspects of the techniques described in this disclosure. In the example of FIG. 8, a video processing device, such as video encoder 20, encapsulation unit 21, decapsulation unit 29, post-processing entity 27, network entity 78, may code one or more non-VCL NAL units of a layer of a multi-layer bitstream that contain an SEI message having an SEI payload type (160). The video processing device may also determines syntax of the multi-layer bitstream to which the SEI message applies based on the payload type (162). For example, the video processing device may determine one or more syntax values of the multi-layer bitstream to which the SEI message applies based on the SEI payload type.

For example, according to aspects of this disclosure, the SEI message may include a scalable nesting SEI message. In this example, the video processing device may determine, based on the SEI payload type being included in a first set of payload types, that a bitstream_subset_flag syntax element of the scalable nesting SEI message is zero valued. In an example, the first set of payload types includes payload types 2, 3, 6, 9, 15, 16, 17, 19, 22, 23, 45, 47, 128, 131, 132, and 134, as described above with respect to FIG. 1, although the set may include more or fewer than those identified in the example.

In another example, the SEI message may be a non-nested SEI message. In this example, the video processing device may determine, based on the SEI payload type being included in a first set of payload types, that a layer identifier syntax element for the non-VCL NAL units containing the SEI message is equal to a layer identifier syntax element of VCL NAL units associated with the SEI message. In an example, the first set of payload types includes payload types 2, 3, 6, 9, 15, 16, 17, 19, 22, 23, 45, 47, 128, 131, 132, and 134, although the set may include more or fewer than those identified.

In still another example, the SEI message may be a scalable nesting SEI message. In this example, the video processing device may determine, based on the SEI payload type being included in a first set of payload types, that the one or more non-VCL NAL units containing the scalable nesting SEI message has a TemporalId that is equal to zero and maxTemporalId[i] that is equal to seven for all values of i. In an example, the first set of payload types includes payload types 2, 3, 6, 9, 15, 16, 17, 19, 22, 23, 45, 47, 128, 131, 132, and 134, although the set may include more or fewer than those identified in the example.

According to aspects of this disclosure, additionally or alternatively, the video processing device may code an active parameter sets SEI message of the multi-layer bitstream only in a non-nested SEI message and not in a scalable nesting SEI message.

Additionally or alternatively, the video processing device may determine that the layer identifier of the layer of multi-layer video data is zero valued based on the SEI message containing a non-nested buffering period SEI message, a picture timing SEI message, or a decoding unit information SEI message. In some examples, the video processing device may also code a layer identifier syntax element to have a zero value.

Additionally or alternatively, the video processing device may code a bitstream_subset_flag syntax element of the multi-layer bitstream. The video coding device may, based on the bitstream_subset_flag syntax element being equal to one and no layer sets specified by a video parameter set (VPS) of the multi-layer bitstream including layer identifiers in the range of zero to a layer identifier of the non-VCL NAL units containing the SEI message, inclusive, determine that a value of a default_op_flag syntax element of the multi-layer bitstream is zero valued. In some examples, the video processing device may also code the default_op_flag syntax element to have a zero value.

According to an additional aspect of this disclosure, additionally or alternatively, the video processing device may code a nesting_op_flag of the multi-layer bitstream and an all_layers_flag of the multi-layer bitstream. The video processing device may, based on the nesting_op_flag having a value of zero and the all_layers_flag having a value of one, determine that a value of a maxTemporalId[0] syntax element of the multi-layer bitstream is equal to seven. In some examples, the video processing device may also code the maxTemporalId[0] syntax element to have a value of seven.

Additionally or alternatively, the video processing device may code a bitstream_subset_flag syntax element of the multi-layer bitstream and a nesting_op_flag syntax element of the multi-layer bitstream. The video processing device may, based on the bitstream_subset_flag syntax element having a value of one and the nesting_op_flag syntax element having a value of zero, determine that a nestingLayeridList[0] of the multi-layer bitstream includes only layer identifier values of a layer set specified in a VPS of the multi-layer bitstream. In some examples, the video processing device may also code the a nestingLayeridList[0] syntax element to only include layer identifier values of a layer set specified in a VPS of the multi-layer bitstream.

It should also be understood that the steps shown and described with respect to FIG. 8 are provided as merely one example. That is, the steps shown in the example of FIG. 8 need not necessarily be performed in the order shown in FIG. 8, and fewer, additional, or alternative steps may be performed. Moreover, while the techniques are generically described above with respect to a video processing device, the techniques may be implemented by a variety of video processing devices, such as video encoder 20, encapsulation unit 21, decapsulation unit 29, post-processing entity 27, network entity 78, or other processing units.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of coding video data, the method comprising:
   obtaining an access unit of a multi-layer bitstream of the video data that includes a first layer and at least one second layer, wherein obtaining the access unit comprises obtaining one or more video coding layer (VCL) network abstraction layer (NAL) units of the first layer and obtaining one or more VCL NAL units of the at least one second layer; and
   coding the access unit, wherein coding the access unit comprises coding one or more first non-VCL NAL units containing a first SEI message applicable to the one or more VCL NAL units of the first layer together with the one or more VCL NAL units of the first layer, and coding one or more second non-VCL NAL units containing a second SEI message applicable to the one or more VCL NAL units of the at least one second layer, such that the bitstream does not contain any coded pictures of any layer other than the first layer of the multi-layer bitstream between the one or more VCL NAL units of the first layer and the one or more first non-VCL NAL units, and does not contain any coded pictures of any layer other than the at least one second layer between the one or more VCL NAL units of the at least one second layer and the one or more second non-VCL NAL units,
   wherein the one or more VCL NAL units of the first layer are VCL NAL units of a first picture of the first layer and the first SEI message comprises a first prefix SEI message applicable to the first picture of the first layer, and wherein coding the one or more first non-VCL NAL units containing the first prefix SEI message together with the one or more VCL NAL units of the first layer comprises coding the one or more first non-VCL NAL units preceding the one or more VCL NAL units of the first layer in the bitstream, and
   wherein the one or more VCL NAL units of the at least one second layer are VCL NAL units of a second picture of the at least one second layer and the second SEI message comprises a second prefix SEI message applicable to the second picture of the at least one second layer, the method further comprising coding the one or more second non-VCL NAL units containing the second prefix SEI message following the first picture in the bitstream.

2. The method of claim 1, wherein coding the one or more first non-VCL NAL units comprises coding the one or more first non-VCL NAL units directly adjacent to the one or more VCL NAL units of the first layer in the multi-layer bitstream, the method further comprising coding the one or more second non-VCL NAL units directly adjacent to the one or more VCL NAL units of the at least one second layer in the multi-layer bitstream.

3. The method of claim 1, wherein the one or more VCL NAL units of the first layer are VCL NAL units of a first picture of the first layer and the first SEI message comprises a first suffix SEI message applicable to the first picture of the first layer, and wherein coding the one or more first non-VCL NAL units containing the first suffix SEI message together with the one or more VCL NAL units of the first layer comprises coding the one or more first non-VCL NAL units subsequent to the one or more VCL NAL units of the first layer in the bitstream.

4. The method of claim 3, wherein the one or more VCL NAL units of the second layer are VCL NAL units of a second picture of the at least one second layer and the second SEI message comprises a second suffix SEI message applicable to the VCL NAL units of the second picture, the method further comprising:
   coding the one or more second non-VCL NAL units following the second picture in the bitstream.

5. The method of claim 1, further comprising determining a maximum repetition parameter for the first SEI message based on a picture unit that contains VCL NAL units of a first picture of the first layer and associated non-VCL NAL units of the first picture, wherein the maximum repetition parameter for the first SEI message represents a maximum number of times that the respective SEI message may be repeated.

6. The method of claim 1, further comprising:
   generating residual data for the one or more VCL NAL units of the first layer indicating a difference between predictive data and actual video data;
   applying a transform to the residual data the generate transform coefficients; and generating the multi-layer bitstream that includes an indication of the transform coefficients.

7. The method of claim 1, further comprising:
obtaining transform coefficients for the one or more VCL NAL units of the first layer from the multi-layer bitstream;
applying an inverse transform to the transform coefficients to generate residual data; and
determining the video data based on the generated residual data.

8. A device for coding video data, the device comprising:
a memory configured to store at least a portion of a multi-layer bitstream of video data; and
one or more processors configured to:
obtain an access unit of a multi-layer bitstream of the video data that includes a first layer and at least one second layer, wherein to obtain the access unit, the one or more processors are configured to obtain one or more video coding layer (VCL) network abstraction layer (NAL) units of the first layer and obtain one or more VCL NAL units of the at least one second layer; and
code the access unit, wherein to code the access unit the one or more processors are configured to code one or more first non-VCL NAL units containing a first SEI message applicable to the one or more VCL NAL units of the first layer together with the one or more VCL NAL units of the first layer, and code one or more second non-VCL NAL units containing a second SEI message applicable to the one or more VCL NAL units of the at least one second layer, such that the bitstream does not contain any coded pictures of any layer other than the first layer of the multi-layer bitstream between the one or more VCL NAL units of the first layer and the one or more first non-VCL NAL units, and does not contain any coded pictures of any layer other than the at least one second layer between the one or more VCL NAL units of the at least one second layer and the one or more second non-VCL NAL units,
wherein the one or more VCL NAL units of the first layer are VCL NAL units of a first picture of the first layer and the first SEI message comprises a first prefix SEI message applicable to the first picture of the first layer, and wherein to code the one or more first non-VCL NAL units containing the first prefix SEI message together with the one or more VCL NAL units of the first layer, the one or more processors are configured to code the one or more first non-VCL NAL units preceding the one or more VCL NAL units of the first layer in the bitstream, and
wherein the one or more VCL NAL units of the at least one second layer are VCL NAL units of a second picture of the at least one second layer and the second SEI message comprises a second prefix SEI message applicable to the second picture of the at least one second layer, and wherein the one or more processors are further configured to code the one or more second non-VCL NAL units containing the second prefix SEI message following the first picture in the bitstream.

9. The device of claim 8, wherein to code the one or more first non-VCL NAL units, the one or more processors are configured to code the one or more first non-VCL NAL units directly adjacent to the one or more VCL NAL units of the first layer in the multi-layer bitstream, and wherein the one or more processors are further configured to code the one or more second non-VCL NAL units directly adjacent to the one or more VCL NAL units of the at least one second layer in the multi-layer bitstream.

10. The device of claim 8, wherein the one or more VCL NAL units of the first layer are VCL NAL units of a first picture of the first layer and the first SEI message comprises a first suffix SEI message applicable to the first picture of the first layer, and wherein to code the one or more first non-VCL NAL units containing the first suffix SEI message together with the one or more VCL NAL units of the first layer, the one or more processors are configured to code the one or more first non-VCL NAL units subsequent to the one or more VCL NAL units of the first layer in the bitstream.

11. The device of claim 10, wherein the one or more VCL NAL units of the second layer are VCL NAL units of a second picture of the at least one second layer and the second SEI message comprises a second suffix SEI message applicable to the VCL NAL units of the second picture, and wherein the one or more processors are further configured to:
code the one or more second non-VCL NAL units following the second picture in the bitstream.

12. The device of claim 8, wherein the one or more processors are further configured to determine a maximum repetition parameter for the first SEI message based on a picture unit that contains VCL NAL units of a first picture of the first layer and associated non-VCL NAL units of the first picture, and wherein the maximum repetition parameter for the first SEI message represents a maximum number of times that the respective SEI message may be repeated.

13. The device of claim 8, wherein the one or more processors are further configured to:
generate residual data for the one or more VCL NAL units of the first layer indicating a difference between predictive data and actual video data;
apply a transform to the residual data the generate transform coefficients; and
generate the multi-layer bitstream that includes an indication of the transform coefficients.

14. The device of claim 8, wherein the one or more processors are further configured to:
obtain transform coefficients for the one or more VCL NAL units of the first layer from the multi-layer bitstream;
apply an inverse transform to the transform coefficients to generate residual data; and
determine the video data based on the generated residual data.

15. The device of claim 8, wherein the device comprises at least one of:
an integrated circuit;
a microprocessor; or
a wireless communication device.

16. An apparatus for coding video data, the apparatus comprising:
means for obtaining an access unit of a multi-layer bitstream of the video data that includes a first layer and at least one second layer, wherein the means for obtaining the access unit comprises means for obtaining one or more video coding layer (VCL) network abstraction layer (NAL) units of the first layer and for obtaining one or more VCL NAL units of the at least one second layer; and
means for coding the access unit, wherein the means for coding the access unit comprises means for coding one or more first non-VCL NAL units containing a first SEI message applicable to the one or more VCL NAL units of the first layer together with the one or more VCL NAL units of the first layer, and coding one or more second non-VCL NAL units containing a second SEI message applicable to the one or more VCL NAL units of the at least one second layer, such that the bitstream does not contain any coded pictures of any layer other than the first layer of the multi-layer bitstream between the one or more VCL NAL units of the first layer and the one or more first non-VCL NAL units, and does not contain any coded pictures of any layer other than the at least one second layer between the one or more VCL NAL units of the at least one second layer and the one or more second non-VCL NAL units, wherein the one or more VCL NAL units of the first layer are VCL NAL units of a first picture of the first layer and the first SEI message comprises a first prefix SEI message applicable to the first picture of the first layer, and wherein the means for coding the one or more first non-VCL NAL units containing the first prefix SEI message together with the one or more VCL NAL units of the first layer comprises means for coding the one or more first non-VCL NAL units preceding the one or more VCL NAL units of the first layer in the bitstream, and wherein the one or more VCL NAL units of the at least one second layer are VCL NAL units of a second picture of the at least one second layer and the second SEI message comprises a second prefix SEI message applicable to the second picture of the at least one second layer, the apparatus further comprising means for coding the one or more second non-VCL NAL units containing the second prefix SEI message following the first picture in the bitstream.

17. The apparatus of claim 16, wherein the means for coding the one or more first non-VCL NAL units comprises means for coding the one or more first non-VCL NAL units directly adjacent to the one or more VCL NAL units of the first layer in the multi-layer bitstream, and further comprising means for coding the one or more second non-VCL NAL units directly adjacent to the one or more VCL NAL units of the at least one second layer in the multi-layer bitstream.

18. The apparatus of claim 16, wherein the one or more VCL NAL units of the first layer are VCL NAL units of a first picture of the first layer and the first SEI message comprises a first suffix SEI message applicable to the first picture of the first layer, and wherein the means for coding the one or more first non-VCL NAL units containing the first suffix SEI message together with the one or more VCL NAL units of the first layer comprises means for coding the one or more first non-VCL NAL units subsequent to the one or more VCL NAL units of the first layer in the bitstream.

19. A non-transitory computer-readable medium having instructions stored thereon that, when executed, cause one or more processors to:
obtain an access unit of a multi-layer bitstream of the video data that includes a first layer and at least one second layer, wherein to obtain the access unit the instructions cause the one or more processors to obtain one or more video coding layer (VCL) network abstraction layer (NAL) units of the first layer and obtain one or more VCL NAL units of the at least one second layer; and code the access unit, wherein to code the access unit, the instructions cause the one or more processors to code one or more first non-VCL NAL units containing a first SEI message applicable to the one or more VCL NAL units of the first layer together with the one or more VCL NAL units of the first layer, and code one or more second non-VCL NAL units containing a second SEI message applicable to the one or more VCL NAL units of the at least one second layer, such that the bitstream does not contain any coded pictures of any layer other than the first layer of the multi-layer bitstream between the one or more VCL NAL units of the first layer and the one or more first non-VCL NAL units, and does not contain any coded pictures of any layer other than the at least one second layer between the one or more VCL NAL units of the at least one second layer and the one or more second non-VCL NAL units, wherein the one or more VCL NAL units of the first layer are VCL NAL units of a first picture of the first layer and the first SEI message comprises a first prefix SEI message applicable to the first picture of the first layer, and wherein to code the one or more first non-VCL NAL units containing the first prefix SEI message together with the one or more VCL NAL units of the first layer, the instructions further cause the one or more processors to code the one or more first non-VCL NAL units preceding the one or more VCL NAL units of the first layer in the bitstream, and wherein the one or more VCL NAL units of the at least one second layer are VCL NAL units of a second picture of the at least one second layer and the second SEI message comprises a second prefix SEI message applicable to the second picture of the at least one second layer, and wherein the instructions further cause the one or more processors to code the one or more second non-VCL NAL units containing the second prefix SEI message following the first picture in the bitstream.

20. The method of claim 1, the method being executable on a wireless communication device, wherein the device comprises:
a memory configured to store the access unit of video data;
a processor configured to process the access unit of video data stored in said memory; and
a receiver configured to receive the access unit of video data.

21. The method of claim 20, wherein the wireless communication device is a cellular telephone and the access unit is received by the receiver and modulated according to a cellular communication standard.

22. The device of claim 8, wherein the device is a wireless communication device, further comprising a receiver configured to receive the access unit of video data.

23. The device of claim 22, wherein the wireless communication device is a cellular telephone and the access unit of video data is received by the receiver and modulated according to a cellular communication standard.

* * * * *